United States Patent
Krabshuis et al.

(10) Patent No.: US 9,405,062 B2
(45) Date of Patent: Aug. 2, 2016

(54) HIGH-BANDWIDTH, RADIATION-RESISTANT MULTIMODE OPTICAL FIBER

(75) Inventors: Gertjan Krabshuis, Sint-Oedenrode (NL); Adrian Amezcua-Correa, Davidson, NC (US); Frans Gooijer, Eindhoven (NL); Gilles Melin, Orsay (FR); Gerard Kuyt, Boxtel (NL); Franciscus Johannes Achten, Tilburg (NL); Stephanus Gerardus Fransiscus Geerings, Helmond (NL); Marianne Bigot-Astruc, Marcoussis (FR)

(73) Assignee: Draka Comteq B.V., Amsterdam (NL)

( * ) Notice: Subject to any disclaimer, the term of this patent is extended or adjusted under 35 U.S.C. 154(b) by 1001 days.

(21) Appl. No.: 13/456,562

(22) Filed: Apr. 26, 2012

(65) Prior Publication Data

US 2012/0275751 A1    Nov. 1, 2012

Related U.S. Application Data

(60) Provisional application No. 61/479,555, filed on Apr. 27, 2011, provisional application No. 61/503,801, filed on Jul. 1, 2011.

(51) Int. Cl.
G02B 6/036    (2006.01)
G02B 6/028    (2006.01)

(52) U.S. Cl.
CPC ............ *G02B 6/0288* (2013.01); *G02B 6/0281* (2013.01); *G02B 6/03627* (2013.01)

(58) Field of Classification Search
CPC ............ G02B 6/02038; G02B 6/0281; G02B 6/0365; G02B 6/268
See application file for complete search history.

(56) References Cited

U.S. PATENT DOCUMENTS

| 4,111,525 | A | 9/1978 | Kaminow et al. |
| 4,184,744 | A | 1/1980 | Onoda et al. |

(Continued)

FOREIGN PATENT DOCUMENTS

| EP | 1845398 A1 | 10/2007 |
| EP | 1921478 A1 | 5/2008 |

(Continued)

OTHER PUBLICATIONS

Kolesar, et al., "Understanding Multimode Bandwidth and Differential Mode Delay Measurements and Their Applications," Proceedings of the 51st Int'l Wire and Cable Symposium, 2002, pp. 453-460.

(Continued)

*Primary Examiner* — Daniel Petkovsek
(74) *Attorney, Agent, or Firm* — Additon, Higgins & Pendleton, P.A.

(57) ABSTRACT

A multimode optical fiber includes a central core and an outer cladding (e.g., an outer optical cladding). Typically, the optical fiber's central core is a depressed, central core having an alpha-index profile (i.e., a graded-index profile), an outer radius $r_1$, and a maximum refractive index difference $\Delta n_1$ with respect to the outer cladding. The central core's alpha-index profile has a minimum refractive index at the central core's outer radius $r_1$ that corresponds to a refractive index difference $\Delta n_{end}$ with respect to the outer cladding. Exemplary optical-fiber embodiments may include an inner cladding having an outer radius $r_2$ and a width $w_2$. Exemplary optical-fiber embodiments may include a buried trench having a width $w_3$ and an outer radius $r_3$. Furthermore, exemplary optical-fiber embodiments may include an intermediate cladding having an outer radius $r_4$ and a width $w_4$.

31 Claims, 9 Drawing Sheets

(56) References Cited

U.S. PATENT DOCUMENTS

| | | |
|---|---|---|
| 4,222,631 A | 9/1980 | Olshansky |
| 4,229,070 A | 10/1980 | Olshansky et al. |
| 4,230,396 A | 10/1980 | Olshansky et al. |
| RE30,635 E | 6/1981 | Kuppers et al. |
| 4,314,833 A | 2/1982 | Kuppers |
| 4,339,174 A | 7/1982 | Levin |
| 4,406,517 A | 9/1983 | Olshansky |
| 4,465,335 A | 8/1984 | Eppes |
| 4,636,235 A | 1/1987 | Glessner et al. |
| 4,636,236 A | 1/1987 | Glessner et al. |
| 4,653,042 A | 3/1987 | d'Auria et al. |
| 4,690,504 A | 9/1987 | Yokokawa et al. |
| 4,715,695 A | 12/1987 | Nishimura et al. |
| 4,723,828 A | 2/1988 | Garel-Jones et al. |
| 4,802,733 A | 2/1989 | Bachmann et al. |
| 4,838,643 A | 6/1989 | Hodges et al. |
| 5,115,486 A | 5/1992 | Bader et al. |
| 5,142,603 A | 8/1992 | Forrester |
| 5,194,714 A | 3/1993 | Le Sergent |
| 5,221,309 A | 6/1993 | Kyoto et al. |
| 5,278,687 A | 1/1994 | Jannson et al. |
| 5,381,503 A | 1/1995 | Kanamori et al. |
| 5,522,007 A | 5/1996 | Drouart et al. |
| 5,574,816 A | 11/1996 | Yang et al. |
| 5,702,497 A | 12/1997 | Oh et al. |
| 5,717,805 A | 2/1998 | Stulpin |
| 5,761,362 A | 6/1998 | Yang et al. |
| 5,841,933 A | 11/1998 | Hoaglin et al. |
| 5,911,023 A | 6/1999 | Risch et al. |
| 5,982,968 A | 11/1999 | Stulpin |
| 6,002,818 A | 12/1999 | Fatehi et al. |
| 6,035,087 A | 3/2000 | Bonicel et al. |
| 6,066,397 A | 5/2000 | Risch et al. |
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |
| 6,185,346 B1 | 2/2001 | Asawa et al. |
| 6,202,447 B1 | 3/2001 | Drouart et al. |
| 6,210,802 B1 | 4/2001 | Risch et al. |
| 6,215,931 B1 | 4/2001 | Risch et al. |
| 6,269,663 B1 | 8/2001 | Drouart et al. |
| 6,292,603 B1 | 9/2001 | Mizuochi et al. |
| 6,292,612 B1 | 9/2001 | Golowich et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,470,126 B1 | 10/2002 | Mukasa |
| 6,490,398 B2 | 12/2002 | Gruner-Nielsen et al. |
| 6,493,491 B1 | 12/2002 | Shen et al. |
| 6,580,863 B2 | 6/2003 | Yegnanarayanan et al. |
| 6,603,908 B2 | 8/2003 | Dallas et al. |
| 6,606,437 B1 | 8/2003 | Mukasa et al. |
| 6,618,538 B2 | 9/2003 | Nechitailo et al. |
| 6,658,184 B2 | 12/2003 | Bourget et al. |
| 6,704,485 B1 | 3/2004 | Campion et al. |
| 6,724,965 B2 | 4/2004 | Abbott et al. |
| 6,724,966 B2 | 4/2004 | Mukasa |
| 6,735,985 B2 | 5/2004 | DiGiovanni et al. |
| 6,749,446 B2 | 6/2004 | Nechitailo |
| 6,750,294 B2 | 6/2004 | Sugiyama et al. |
| 6,771,865 B2 | 8/2004 | Blaszyk et al. |
| 6,853,798 B1 | 2/2005 | Weiss |
| 6,856,739 B2 | 2/2005 | Zhang et al. |
| 6,904,218 B2 | 6/2005 | Sun et al. |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,006,751 B2 | 2/2006 | Provost et al. |
| 7,043,126 B2 | 5/2006 | Guan et al. |
| 7,043,128 B2 | 5/2006 | DiGiovanni et al. |
| 7,045,010 B2 | 5/2006 | Sturman, Jr. |
| 7,089,765 B2 | 8/2006 | Schaper et al. |
| 7,162,128 B2 | 1/2007 | Lovie et al. |
| 7,228,032 B2 | 6/2007 | Blauvelt et al. |
| 7,315,677 B1 | 1/2008 | Li et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,400,835 B2 | 7/2008 | Sardesai et al. |
| 7,406,235 B2 | 7/2008 | Guan et al. |
| 7,421,172 B2 | 9/2008 | Matthijsse et al. |
| 7,421,174 B2 | 9/2008 | Fleming, Jr. et al. |
| 7,440,673 B2 | 10/2008 | Aikawa et al. |
| 7,483,612 B2 | 1/2009 | Digiovanni et al. |
| 7,483,613 B2 | 1/2009 | Bigot-Astruc et al. |
| 7,515,795 B2 | 4/2009 | Overton et al. |
| 7,526,160 B1 | 4/2009 | Homa et al. |
| 7,526,177 B2 | 4/2009 | Matthijsse et al. |
| 7,539,381 B2 | 5/2009 | Chen et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,574,095 B2 | 8/2009 | Lock et al. |
| 7,587,111 B2 | 9/2009 | de Montmorillon et al. |
| 7,593,612 B2 | 9/2009 | Shimotakahara |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,646,955 B2 | 1/2010 | Donlagic |
| 7,665,902 B2 | 2/2010 | Griffioen et al. |
| 7,689,093 B2 | 3/2010 | Matthijsse et al. |
| 7,702,204 B2 | 4/2010 | Gonnet et al. |
| 7,724,998 B2 | 5/2010 | Parris et al. |
| 7,783,149 B2 | 8/2010 | Fini |
| 7,787,731 B2 | 8/2010 | Bookbinder et al. |
| 7,817,257 B2 | 10/2010 | Takenaga et al. |
| 7,817,891 B2 | 10/2010 | Lavenne et al. |
| 7,826,691 B2 | 11/2010 | Matthijsse et al. |
| 7,865,050 B1 | 1/2011 | Sun et al. |
| 7,878,712 B2 | 2/2011 | Shimotakahara et al. |
| 7,889,960 B2 | 2/2011 | de Montmorillon et al. |
| 7,903,917 B2 | 3/2011 | Bickham et al. |
| 7,903,918 B1 | 3/2011 | Bickham et al. |
| 7,970,247 B2 | 6/2011 | Barker |
| 7,974,507 B2 | 7/2011 | Lovie et al. |
| 7,995,888 B2 | 8/2011 | Gholami et al. |
| 8,009,950 B2 | 8/2011 | Molin et al. |
| 8,031,997 B2 | 10/2011 | Overton |
| 8,041,167 B2 | 10/2011 | Overton |
| 8,041,168 B2 | 10/2011 | Overton |
| 8,041,172 B2 | 10/2011 | Sillard et al. |
| 8,055,111 B2 | 11/2011 | Sillard et al. |
| 8,081,853 B2 | 12/2011 | Overton |
| 8,145,025 B2 | 3/2012 | de Montmorillon et al. |
| 8,145,026 B2 | 3/2012 | Overton et al. |
| 8,145,027 B2 | 3/2012 | Overton et al. |
| 8,165,439 B2 | 4/2012 | Overton |
| 8,184,936 B2 | 5/2012 | Zhang et al. |
| 8,195,018 B2 | 6/2012 | Overton et al. |
| 8,385,703 B2* | 2/2013 | Bennett et al. ............. 385/124 |
| 8,428,411 B2 | 4/2013 | de Montmorillon et al. |
| 8,554,039 B2* | 10/2013 | Benjamin et al. ......... 385/128 |
| 8,879,878 B2 | 11/2014 | Bigot-Astruc et al. |
| 2001/0036349 A1* | 11/2001 | Abe et al. .................. 385/124 |
| 2002/0102082 A1 | 8/2002 | Sarchi et al. |
| 2002/0176678 A1 | 11/2002 | Mukasa |
| 2002/0197038 A1 | 12/2002 | Abbott et al. |
| 2003/0024276 A1 | 2/2003 | Anderson et al. |
| 2004/0146260 A1 | 7/2004 | Kalish et al. |
| 2004/0247269 A1 | 12/2004 | Hirano et al. |
| 2005/0008312 A1 | 1/2005 | Jang et al. |
| 2006/0039665 A1 | 2/2006 | Matsuo et al. |
| 2006/0263019 A1 | 11/2006 | Negishi et al. |
| 2007/0172182 A1 | 7/2007 | Lee et al. |
| 2007/0274666 A1 | 11/2007 | Aikawa et al. |
| 2008/0166094 A1 | 7/2008 | Bookbinder et al. |
| 2008/0292262 A1 | 11/2008 | Overton et al. |
| 2009/0059353 A1 | 3/2009 | Fini |
| 2009/0060437 A1 | 3/2009 | Fini et al. |

(56) References Cited

U.S. PATENT DOCUMENTS

| | | |
|---|---|---|
| 2009/0092365 A1 | 4/2009 | Donlagic |
| 2009/0154888 A1 | 6/2009 | Abbott, III et al. |
| 2009/0169163 A1 | 7/2009 | Abbott, III et al. |
| 2009/0175583 A1 | 7/2009 | Overton |
| 2009/0214167 A1 | 8/2009 | Lookadoo et al. |
| 2009/0279833 A1 | 11/2009 | Overton et al. |
| 2009/0279835 A1 | 11/2009 | de Montmorillon et al. |
| 2009/0297107 A1 | 12/2009 | Tatat |
| 2010/0021170 A1 | 1/2010 | Lumineau et al. |
| 2010/0028020 A1 | 2/2010 | Gholami et al. |
| 2010/0040336 A1 | 2/2010 | Chen et al. |
| 2010/0067858 A1 | 3/2010 | Kim et al. |
| 2010/0092135 A1 | 4/2010 | Barker et al. |
| 2010/0092138 A1 | 4/2010 | Overton |
| 2010/0118388 A1 | 5/2010 | Pastouret et al. |
| 2010/0119202 A1 | 5/2010 | Overton |
| 2010/0135624 A1 | 6/2010 | Overton et al. |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 | 6/2010 | Testu et al. |
| 2010/0154479 A1 | 6/2010 | Milicevic et al. |
| 2010/0166375 A1 | 7/2010 | Parris |
| 2010/0171945 A1 | 7/2010 | Gholami et al. |
| 2010/0183821 A1 | 7/2010 | Hartsuiker et al. |
| 2010/0189397 A1 | 7/2010 | Richard et al. |
| 2010/0189399 A1 | 7/2010 | Sillard et al. |
| 2010/0189400 A1 | 7/2010 | Sillard et al. |
| 2010/0202741 A1 | 8/2010 | Ryan et al. |
| 2010/0214649 A1 | 8/2010 | Burov et al. |
| 2010/0215328 A1 | 8/2010 | Tatat et al. |
| 2010/0220966 A1 | 9/2010 | Bennett |
| 2010/0254653 A1 | 10/2010 | Molin et al. |
| 2010/0310218 A1 | 12/2010 | Molin et al. |
| 2011/0002590 A1 | 1/2011 | Ooizumi et al. |
| 2011/0026889 A1 | 2/2011 | Risch et al. |
| 2011/0037183 A1 | 2/2011 | Tudury et al. |
| 2011/0044594 A1 | 2/2011 | Tudury et al. |
| 2011/0044596 A1 | 2/2011 | Zhang et al. |
| 2011/0054861 A1 | 3/2011 | Lane |
| 2011/0054862 A1 | 3/2011 | Pimpinella et al. |
| 2011/0058781 A1 | 3/2011 | Molin et al. |
| 2011/0064367 A1 | 3/2011 | Molin et al. |
| 2011/0064371 A1 | 3/2011 | Leatherman et al. |
| 2011/0069724 A1 | 3/2011 | Richard et al. |
| 2011/0069932 A1 | 3/2011 | Overton et al. |
| 2011/0085770 A1 | 4/2011 | Bigot-Astruc et al. |
| 2011/0085772 A1 | 4/2011 | Benjamin et al. |
| 2011/0091171 A1 | 4/2011 | Tatat et al. |
| 2011/0091175 A1 | 4/2011 | Sanders et al. |
| 2011/0116160 A1 | 5/2011 | Boivin et al. |
| 2011/0123161 A1 | 5/2011 | Molin et al. |
| 2011/0123162 A1 | 5/2011 | Molin et al. |
| 2011/0135262 A1 | 6/2011 | Molin et al. |
| 2011/0135263 A1 | 6/2011 | Molin et al. |
| 2011/0176782 A1 | 7/2011 | Parris |
| 2011/0188823 A1 | 8/2011 | Sillard et al. |
| 2011/0188826 A1 | 8/2011 | Sillard et al. |
| 2011/0217012 A1 | 9/2011 | Bigot-Astruc et al. |
| 2011/0229101 A1 | 9/2011 | de Montmorillon et al. |
| 2011/0268398 A1 | 11/2011 | Quinn et al. |
| 2011/0268400 A1 | 11/2011 | Lovie et al. |
| 2011/0287195 A1 | 11/2011 | Molin |
| 2011/0305423 A1 | 12/2011 | Molin et al. |
| 2012/0009358 A1 | 1/2012 | Gharbi et al. |
| 2012/0014652 A1 | 1/2012 | Parris |
| 2012/0039361 A1 | 2/2012 | Gooijer et al. |
| 2012/0040105 A1 | 2/2012 | Overton |
| 2012/0040184 A1 | 2/2012 | de Montmorillon et al. |
| 2012/0051703 A1 | 3/2012 | Bigot-Astruc et al. |
| 2012/0057833 A1 | 3/2012 | Tatat |
| 2012/0092651 A1 | 4/2012 | Molin et al. |
| 2012/0134376 A1 | 5/2012 | Burov et al. |
| 2012/0148206 A1 | 6/2012 | Boivin et al. |
| 2012/0195549 A1 | 8/2012 | Molin et al. |
| 2012/0195561 A1 | 8/2012 | Molin et al. |
| 2012/0213483 A1 | 8/2012 | Risch et al. |
| 2012/0224254 A1 | 9/2012 | Burov et al. |
| 2012/0243843 A1 | 9/2012 | Molin et al. |
| 2012/0251062 A1 | 10/2012 | Molin et al. |
| 2012/0275751 A1 | 11/2012 | Krabshuis et al. |
| 2012/0301093 A1 | 11/2012 | Sillard et al. |
| 2012/0315006 A1 | 12/2012 | Bigot-Astruc et al. |
| 2013/0004135 A1 | 1/2013 | Bigot-Astruc et al. |
| 2013/0028564 A1 | 1/2013 | Molin et al. |
| 2013/0071114 A1 | 3/2013 | Bickham et al. |

FOREIGN PATENT DOCUMENTS

| | | |
|---|---|---|
| EP | 2166386 A1 | 3/2010 |
| EP | 2220524 A1 | 8/2010 |
| EP | 2312350 A1 | 4/2011 |
| EP | 2418523 A2 | 2/2012 |
| EP | 2518546 A1 | 10/2012 |
| EP | 2541292 A1 | 2/2013 |
| GB | 2449164 A | 11/2008 |
| JP | 06-216440 A | 8/1994 |
| JP | 08-304636 A | 11/1996 |
| JP | 09-048629 | 2/1997 |
| JP | 11-064665 A | 3/1999 |
| JP | 2000-347057 A2 | 12/2000 |
| JP | 2001-235648 | 8/2001 |
| JP | 2002-318315 A | 10/2002 |
| JP | 2006-047719 A | 2/2006 |
| JP | 2006-078543 A | 3/2006 |
| JP | 2006-227173 A | 8/2006 |
| JP | 2007-272239 | 10/2007 |
| JP | 2008-102331 | 5/2008 |
| WO | 00/50941 A1 | 8/2000 |
| WO | 03/081301 A1 | 10/2003 |
| WO | 2005/106544 A1 | 11/2005 |
| WO | 2009/062131 A1 | 5/2009 |
| WO | 2009/078962 A1 | 6/2009 |
| WO | 2010/036684 A2 | 4/2010 |
| WO | 2011/040830 A1 | 4/2011 |
| WO | 2011/109263 A1 | 9/2011 |

OTHER PUBLICATIONS

Coleman et al., "Calculated EMB Enhances 10GbE Performance Reliability for Laser-Optimized 50/125 μm Multimode Fiber," Corning Cable Systems Whitepaper (Mar. 2005).
Kuhnhenn, et al., "Quality Assurance for Irradiation Tests of Optical Fibers: Uncertainty and Reproducibility", IEEE Transactions on Nuclear Science, vol. 56, No. 4, Aug. 2009, at 2160-2166.
Dutch Search Report in counterpart Dutch Application No. 2007032 dated Feb. 14, 2012, pp. 1-11.
Nagasawa, et al., "Gamma-Ray Induced 2eV Optical Absorption Bank in Pure-Silica Core Fibers", Japanese Journal of Applied Physics, vol. 26, No. 6, (Jun. 1987) pp. L1009-L1011.
Kuhnhenn, et al., "Irradiation test of multi-mode fibres", Fraunhofer Int., (May 2010) pp. 1-13.
Matthijsse et al., "Towards the low limits of 1383 nm loss in PCVD enabled single mode fibre production", OFC 2004, Los Angeles, paper TuB5, Feb. 2004, pp. 1-3.
European Search Report in counterpart European Application No. 12165137.6 dated Aug. 20, 2012, pp. 1-9.
Bogatyrjov et al., "Super-high-strength metal-coated low-hydroxyl low-chlorine all-silica optical fibers", IEEE Transactions on Nuclear Science, IEEE Service Center, New York, NY, vol. 43, No. 3, Jun. 1, 1996, pp. 1057-1060 [cited in European Search Report].
U.S. Appl. No. 13/534,793 for "Multimode Optical Fiber", filed Jun. 27, 2012, pp. 1-92.
Yabre, "Comprehensive Theory of Dispersion in Graded Index Optical Fibers", Journal of Lightwave Technology, Feb. 2000, vol. 18, No. 2, pp. 166-177.
Sasaki, P.L. Francois, D.N. Payne, "Accuracy and resolution of preform index-profiling by the spatial-filtering method," ECOC'81, 6.4-1, Copenhagen, Denmark.
Kashima et al., "Transmission characteristics of graded-index optical fibers with a lossy outer layer," Applied Optics USA, vol. 17, No. 8, Apr. 15, 1978.

(56) References Cited

OTHER PUBLICATIONS

Jacomme, "Modal dispersion in multimode graded-index fibers," Applied Optics USA, vol. 14, No. 11, Nov. 1, 1975, pp. 2578-2584.
Okamoto et al., "Computer-Aided Synthesis of the Optimum Refractive-Index Profile for a Multimode Fiber," IEEE Transaction on Microwave Theory and Techniques, USA, vol. MTT-25, No. 3, Mar. 1977, pp. 1-10.
Donalagic, "Opportunities to Enhance Multimode Fiber Links by Application of Overfilled Launch," Journal of Lightwave Technology, vol. 23, No. 11, (Nov. 2005) pp. 3526-3540.
Morikuni et al., "Simulation-Based Prediction of Multimode Fiber Bandwidth for 10 Gb/s Systems," LEOS 2002, 15th Annual Meeting of IEEE Lasers & Electro-Optics Society, Glascow, Scotland, pp. 1-2.
Guan et al., "Multimode Fibers for Compensating Intermodal Dispersion of Graded-Index Multimode Fibers", Jul. 2004, Journal of Lightwave Technology, vol. 22, No. 7, pp. 1714-1719.
Gloge et al., "Multimode Theory of Graded-Core Fibers", Bell System Technical Journal, vol. 52, No. 9, Nov. 1, 1973, pp. 1563-1578.
Kaminow et al., "Profile synthesis in multicomponent glass optical fibers", Applied Optics, vol. 16, No. 1, Jan. 1, 1977, pp. 108-112.
Molin et al., "Low Bending Sensitivity of Regular OM3/OM4 Fibers in 10GbE Applications", Optical Fiber Communication (OFC) Collocated National Fiber Optic Engineers Conference, 2010 Conference on (OFC/NFOEC), IEEE, Piscataway, NJ, Mar. 21, 2010, pp. 1-3.
Pepeljugoski et al., "15.6-Gb/s Transmission Over 1 km of Next Generation Multimode Fiber", IEEE Photonics Technology Letters, vol. 14, No. 5, May 2002, pp. 1-3.
Freund, et al., "High-Speed Transmission in Multimode Fibers", Journal of Lightwave Technology, vol. 28, No. 4, Feb. 15, 2010, pp. 1-18.
English-translation of Office Action in counterpart Japanese Application No. 2012-099273, dated Sep. 1, 2015, pp. 1-5.

\* cited by examiner

US 9,405,062 B2

HIGH-BANDWIDTH, RADIATION-RESISTANT MULTIMODE OPTICAL FIBER

CROSS-REFERENCE TO PRIORITY APPLICATIONS

This U.S. nonprovisional application claims the benefit of U.S. Patent Application Ser. No. 61/479,555 for High-Bandwidth, Radiation-Resistant Multimode Optical Fiber (filed Apr. 27, 2011) and U.S. Patent Application Ser. No. 61/503,801 for High-Bandwidth, Radiation-Resistant Multimode Optical Fiber (filed Jul. 1, 2011), each of which is hereby incorporated by reference in its entirety.

FIELD OF THE INVENTION

The present invention relates to the field of optical fibers and, more specifically, high-bandwidth multimode optical fibers for high radiation applications.

BACKGROUND

An optical fiber (i.e., a glass fiber typically surrounded by one or more coating layers) conventionally includes an optical fiber core, which transmits and/or amplifies an optical signal, and an optical cladding, which confines the optical signal within the core. Accordingly, the refractive index of the core $n_c$ is typically greater than the refractive index of the optical cladding $n_g$ (i.e., $n_c > n_g$).

For optical fibers, the refractive index profile is generally classified according to the graphical appearance of the function that associates the refractive index with the radius of the optical fiber. Conventionally, the distance r to the center of the optical fiber is shown on the x-axis, and the difference between the refractive index (at radius r) and the refractive index of the optical fiber's outer cladding (e.g., an outer optical cladding) is shown on the y-axis. The refractive index profile is referred to as a "step" profile, "trapezoidal" profile, "alpha" profile, or "triangular" profile for graphs having the respective shapes of a step, a trapezoid, an alpha, or a triangle. These curves are generally representative of the optical fiber's theoretical or set profile. Constraints in the manufacture of the optical fiber, however, may result in a slightly different actual profile.

Generally speaking, two main categories of optical fibers exist: multimode fibers and single-mode fibers. In a multimode optical fiber, for a given wavelength, several optical modes are propagated simultaneously along the optical fiber. In a single-mode optical fiber, the signal propagates in a fundamental LP01 mode that is guided in the fiber core, while the higher order modes (e.g., the LP11 mode) are strongly attenuated. The typical diameter of a single-mode or multimode glass fiber is 125 microns. The core of a multimode optical fiber typically has a diameter of between about 50 microns and 62.5 microns, whereas the core of a single-mode optical fiber typically has a diameter of between about 6 microns and 9 microns. Multimode systems are generally less expensive than single-mode systems because multimode light sources, connectors, and maintenance can be obtained at a lower cost.

Multimode optical fibers are commonly used for short-distance applications requiring a broad bandwidth, such as local networks or LAN (local area network). Multimode optical fibers have been the subject of international standardization under the ITU-T G.651.1 recommendations, which, in particular, define criteria (e.g., bandwidth, numerical aperture, and core diameter) that relate to the requirements for optical fiber compatibility. The ITU-T G.651.1 standard is hereby incorporated by reference in its entirety.

In addition, the OM3 standard has been adopted to meet the demands of high-bandwidth applications (i.e., a data rate higher than 1 GbE) over long distances (i.e., distances greater than 300 meters). The OM3 standard is hereby incorporated by reference in its entirety. With the development of high-bandwidth applications, the average core diameter for multimode optical fibers has been reduced from 62.5 microns to 50 microns.

There has been increasing interest in using optical fibers in nuclear power plants and other radiation-rich environments, such as particle acceleration laboratories and satellites. For example, optical fibers may be used in optical data communication links, distributed sensors, plasma diagnostics, and instrumentation systems. In such applications, optical fibers typically transmit signals through noisy electromagnetic environments, high gamma ray dosages and/or dosage rates, and high neutron fluences.

Signals transmitted via optical fibers typically undergo optical losses (i.e., attenuation) that accumulate over the distance traveled. These transmission losses increase substantially when the optical fiber is subjected to ionizing radiation, such as beta, alpha, gamma, and/or X-rays.

Generally speaking, radiation affects the optical properties of an optical fiber in two ways.

The first is referred to as "radiation-induced attenuation" (RIA), which occurs when radiation creates defects in the silica of the optical fiber. These defects absorb the transmitted electromagnetic signals. Radiation-induced absorption, therefore, increases the attenuation experienced by an optical signal as it is transmitted along an optical fiber's length.

The second is referred to as a radiation-induced refractive index change, which occurs when radiation induces refractive index changes in portions of the optical fiber. These refractive index changes can compromise the bandwidth of the optical fiber, in turn compromising the reliability of an optical transmission system. Accordingly, optical fibers used in radiation-rich environments should exhibit good radiation resistance.

Therefore, a need exists for a multimode optical fiber having a high bandwidth and good radiation resistance. More particularly, a need exists for a high bandwidth multimode optical fiber that exhibits low radiation-induced attenuation.

SUMMARY

Accordingly, in one aspect, the present invention embraces an optical fiber that includes a central core, an interior cladding layer (e.g., an inner cladding), and an outer cladding (e.g., an outer optical cladding). Typically, the optical fiber's central core is a glass-based central core having an alpha-index profile (i.e., a graded-index profile) and an outer radius $r_1$.

The central core's alpha-index profile has a minimum refractive index value at the central core's outer radius $r_1$ that corresponds to a minimum refractive index difference $\Delta n_{end}$ with respect to the outer cladding. More specifically, the central core has an outer radius $r_1$ and an alpha-index profile, and, at the central core's outer radius $r_1$, a refractive index difference $\Delta n_{end}$ with respect to the outer cladding (e.g., the innermost portion of the outer cladding).

Similarly, the central core's alpha-index profile has a maximum refractive index value (e.g., at the center of the central core) that corresponds to a maximum refractive index difference $\Delta n_1$ with respect to the outer cladding. Typically, the central core's maximum refractive index difference $\Delta n_1$ is approximately equal to or less than zero. Stated differently, the central core's maximum refractive index value is typically equal to or less than the outer cladding's refractive index value.

The optical fiber's inner cladding is positioned between the central core and the outer cladding. The inner cladding has an outer radius $r_2$, a width $w_2$, and a refractive index difference $\Delta n_2$ with respect to the outer cladding.

In an exemplary embodiment, the optical fiber's central core has a maximum refractive index difference $\Delta n_1$ of between 0 and $-5 \times 10^{-3}$ (e.g., between $-0.05 \times 10^{-3}$ and $-2 \times 10^{-3}$).

In another exemplary embodiment, the central core's outer radius $r_2$ is between 22.5 microns and 27.5 microns (i.e., 25±2.5 microns).

In yet another exemplary embodiment, the central core's minimum refractive index $\Delta n_{end}$ is between $-14 \times 10^{-3}$ and $-21 \times 10^{-3}$ (e.g., between $-15 \times 10^{-3}$ and $-17 \times 10^{-3}$).

In yet another exemplary embodiment, the central core's alpha index profile has an alpha parameter of between 1.90 and 2.15.

In yet another exemplary embodiment, the inner cladding's refractive index difference $\Delta n_2$ is between $-14 \times 10^{-3}$ and $-21 \times 10^{-3}$ (e.g., between $-15 \times 10^{-3}$ and $-16 \times 10^{-3}$).

In yet another exemplary embodiment, the inner cladding's width $w_2$ is between 5 microns and 37.5 microns (e.g., between 10 microns and 25 microns).

In yet another exemplary embodiment, the inner cladding's width $w_2$ is 20 microns or greater.

In yet another exemplary embodiment, the inner cladding's outer radius $r_2$ is between 30 microns and 62.5 microns (e.g., between 35 microns and 50 microns).

In yet another exemplary embodiment, the inner cladding's outer radius $r_2$ is greater than 45 microns (e.g., between 50 microns and 62.5 microns).

In yet another exemplary embodiment, the inner cladding's refractive index difference $\Delta n_2$ is approximately equal to the central core's minimum refractive index difference $\Delta n_{end}$.

In yet another exemplary embodiment, the optical fiber has a numerical aperture of 0.200±0.015 (i.e., between 0.185 and 0.215).

In yet another exemplary embodiment, across the entire width of the central core, the optical fiber's chlorine concentration is less than 0.10 weight percent.

In yet another exemplary embodiment, across 95 percent of the central core's width, the optical fiber's chlorine concentration is less than 0.08 weight percent (e.g., less than 0.07 weight percent).

In yet another exemplary embodiment, the optical fiber's average chlorine concentration is 0.06 weight percent or less (e.g., less than about 0.05 weight percent).

In yet another exemplary embodiment, at a wavelength of 856 nanometers, a temperature of about 24° C., and a radiation dose rate of 0.15 Gy/s, the optical fiber exhibits a radiation-induced attenuation of about 26.7 dB/km or less after a radiation dose of 650 grays.

In yet another exemplary embodiment, at a wavelength of 856 nanometers, a temperature of about 24° C., and a radiation dose rate of 0.15 Gy/s, the optical fiber exhibits a radiation-induced attenuation that increases by about 5.6 percent or less from a dosage of 650 grays to 10,000 grays.

In yet another exemplary embodiment, the optical fiber has a halogen ratio at the central core's outer radius of more than 30 (e.g., between 50 and 500).

In yet another exemplary embodiment, the optical fiber has a core-cladding-average halogen ratio of more than 20 (e.g., between 22 and 300).

In yet another exemplary embodiment, the optical fiber has a core-cladding-average halogen ratio of between 25 and 269 (e.g., between 48 and 240).

In yet another exemplary embodiment, the optical fiber has a core-cladding-average halogen ratio of between 53 and 200 (e.g., between 60 and 140).

In yet another exemplary embodiment, the optical fiber has a core-average halogen ratio of more than 20 (e.g., between 30 and 170).

In another aspect, the present invention embraces an optical fiber that includes a central core and an interior cladding layer (e.g., an inner cladding). Typically, the optical fiber's central core is a glass-based central core having an alpha-index profile (i.e., a graded-index profile) and an outer radius $r_1$.

The central core's alpha-index profile has a minimum refractive index value at the central core's outer radius $r_1$ that corresponds to a minimum refractive index difference $\Delta n_{end}$ with respect to pure silica. More specifically, the central core has an outer radius $r_1$ and an alpha-index profile, and, at the central core's outer radius $r_1$, a refractive index difference $\Delta n_{end}$ with respect to pure silica.

Similarly, the central core's alpha-index profile has a maximum refractive index value (e.g., at the center of the central core) that corresponds to a maximum refractive index difference $\Delta n_1$ with respect to pure silica. Typically, the central core's maximum refractive index difference $\Delta n_1$ is approximately equal to or less than zero. Stated differently, the central core's maximum refractive index value is typically equal to or less than pure silica's refractive index value. The optical fiber's inner cladding is positioned around the central core. The inner cladding has an outer radius $r_2$, a width $w_2$, and a refractive index difference $\Delta n_2$ with respect to pure silica.

In yet another aspect, the present invention embraces an optical fiber that includes a central core, a buried trench, an interior cladding layer (e.g., an intermediate cladding), and an outer cladding (e.g., an outer optical cladding). Typically, the buried trench is positioned between the central core and the outer cladding (e.g., immediately surrounding the central core). The buried trench has a width $w_3$, an outer radius $r_3$, and a refractive index difference $\Delta n_3$ with respect to the outer cladding. The intermediate cladding is typically positioned between the buried trench and the outer cladding (e.g., immediately surrounding the buried trench). The intermediate cladding has an outer radius $r_4$, a width $w_4$, and a refractive index difference $\Delta n_4$ with respect to the outer cladding.

In yet another aspect, the present invention embraces an optical fiber that includes a central core, an inner cladding, a buried trench, an intermediate cladding, and an outer cladding (e.g., an outer optical cladding). Typically, the inner cladding is positioned between the central core and the outer cladding (e.g., immediately surrounding the central core). The inner cladding has an outer radius $r_2$, a width $w_2$, and a refractive index difference $\Delta n_2$ with respect to the outer cladding. The buried trench is typically positioned between the inner cladding and the outer cladding (e.g., immediately surrounding the inner cladding). The buried trench has a width $w_3$, an outer radius $r_3$, and a refractive index difference $\Delta n_3$ with respect to the outer cladding. Additionally, the intermediate cladding is typically positioned between the buried trench and the outer cladding (e.g., immediately surrounding the buried trench). The intermediate cladding has an outer radius $r_4$, a width $w_4$, and a refractive index difference $\Delta n_4$ with respect to the outer cladding.

In yet another aspect, the present invention embraces an optical fiber that exhibits excellent hydrogen resistance.

In another aspect, the present invention embraces an optical transmission system that includes at least a portion of an optical fiber in accordance with the foregoing. In an exemplary embodiment, the optical system has a data rate of at least 10 Gb/s over at least 100 meters (e.g., 300 meters).

In yet another aspect, the present invention embraces a method of making an optical fiber. Typically, the method includes supplying reactive gases to one side of a substrate tube. The interior of the substrate tube is typically supplied with oxygen at a flow rate that is approximately 1.8 times higher than in a conventional chemical vapor deposition technique. The method also includes reciprocating an energy source between two reversal points along the substrate tube to promote the formation of a glass layer.

In an exemplary embodiment, the method includes reciprocating a plasma generator between two reversal points along the substrate tube.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a multimode optical fiber having a high bandwidth and low radiation-induced attenuation. Typically, the optical fiber includes a central core, an inner cladding, and an outer cladding.

An optical fiber should have sufficient bandwidth to perform well in a high-bandwidth application. For a given wavelength, the bandwidth of an optical fiber may be characterized in several different ways. Typically, a distinction is made between the so-called "overfilled modal bandwidth" (OMB) and the so-called "effective modal bandwidth" (EMB). The acquisition of the OMB bandwidth assumes the use of a light source exhibiting uniform excitation over the entire radial surface of the optical fiber (i.e., an overfilled launch condition using, for example, a laser diode or light emitting diode (LED)).

Recently developed light sources used in high-bandwidth applications, such as VCSELs (Vertical Cavity Surface Emitting Lasers), exhibit an inhomogeneous excitation over the radial surface of the optical fiber. For this kind of light source, the OMB bandwidth is a less suitable measurement so it is preferable to use the effective modal bandwidth (EMB). The calculated effective modal bandwidth (EMBc) estimates the minimum EMB of a multimode optical fiber independent of the kind of VCSEL used. The EMBc is obtained from a differential-mode-delay (DMD) measurement (e.g., as set forth in the FOTP-220 standard).

An exemplary method of measuring DMD and calculating the effective modal bandwidth can be found in the FOTP-220 standard, which is hereby incorporated by reference in its entirety. Further details on this technique are set forth in the following publications, each of which is hereby incorporated by reference: P. F. Kolesar and D. J. Mazzarese, "*Understanding Multimode Bandwidth and Differential Mode Delay Measurements and Their Applications*," Proceedings of the 51st Int'l Wire and Cable Symposium, 2002, pp. 453-460; and Doug Coleman and Phillip Bell, "*Calculated EMB Enhances 10 GbE Performance Reliability for Laser-Optimized 50/125 µm Multimode Fiber*," Corning Cable Systems Whitepaper (March 2005).

Figure 1:
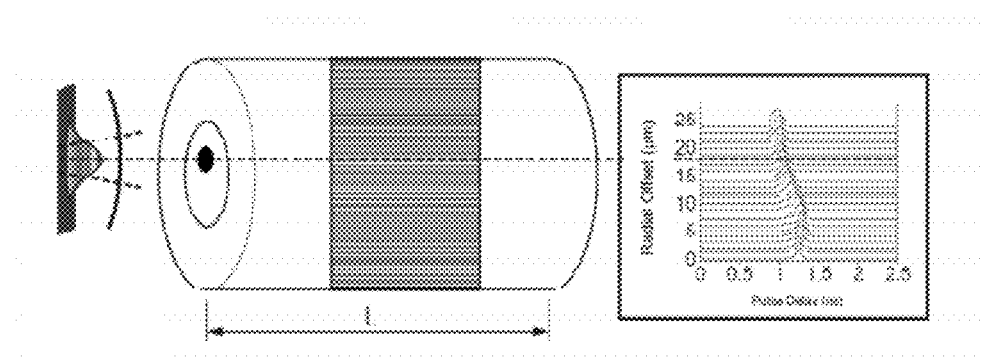
FIG. 1 schematically depicts an exemplary DMD measurement method and graph.

FIG. 1 shows a schematic diagram of a DMD measurement according to the criteria of the FOTP-220 standard as published in its TIA SCFO-6.6 version (Nov. 22, 2002). FIG. 1 schematically represents a part of an optical fiber (i.e., an optical core surrounded by an outer cladding). A DMD graph is obtained by successively injecting light pulses of a given wavelength $\lambda_0$ into the multimode optical fiber with a radial offset between each successive pulse. The delay of each pulse is then measured after a given length of fiber L. Multiple identical light pulses (i.e., light pulses having the same amplitude, wavelength, and frequency) are injected with different radial offsets with respect to the center of the multimode optical fiber's core. The injected light pulse is depicted in FIG. 1 as a dot on the optical core of the optical fiber. In order to characterize an optical fiber with a 50-micron diameter, the FOTP-220 standard recommends that individual measurements be carried out at radial offset intervals of about two microns or less. From these measurements, it is possible to determine the modal dispersion and the calculated effective modal bandwidth (EMBc).

The TIA-492AAAC-A standard, which is hereby incorporated by reference in its entirety, specifies the performance requirements for 50-micron-diameter multimode optical fibers used over long distances in Ethernet high-bandwidth transmission network applications. The OM3 standard requires, at a wavelength of 850 nanometers, an EMB of at least 2,000 MHz·km. The OM3 standard assures error-free transmissions for a data rate of 10 Gb/s (10 GbE) up to a distance of 300 meters. The OM4 standard requires, at a wavelength of 850 nanometers, an EMB of at least 4,700

MHz·km to obtain error-free transmissions for a data rate of 10 Gb/s (10 GbE) up to a distance of 550 meters. The OM4 standard is hereby incorporated by reference in its entirety.

In a multimode optical fiber, the difference between the propagation times, or group delay times, of the several modes along the optical fiber determine the optical fiber's bandwidth. In particular, for the same propagation medium (i.e., in a step-index multimode optical fiber), the different modes have different group delay times. This difference in group delay times results in a time lag between the pulses propagating along different radial offsets of the optical fiber.

For example, as shown in the graph on the right side of FIG. 1, a time lag is observed between the individual pulses. This FIG. 1 graph depicts each individual pulse in accordance with its radial offset in microns (y-axis) and the time in nanoseconds (x-axis) the pulse took to pass along a given length of the optical fiber.

As depicted in FIG. 1, the location of the peaks along the x-axis varies, which indicates a time lag (i.e., a delay) between the individual pulses. This delay causes a broadening of the resulting light pulse. Broadening of the light pulse increases the risk of the pulse being superimposed onto a trailing pulse and reduces the bandwidth (i.e., data rate) supported by the optical fiber. The bandwidth, therefore, is directly linked to the group delay time of the optical modes propagating in the multimode core of the optical fiber. Thus, to guarantee a broad bandwidth, it is desirable for the group delay times of all the modes to be identical. Stated differently, the intermodal dispersion should be zero, or at least minimized, for a given wavelength.

To reduce intermodal dispersion, exemplary multimode optical fibers of the present invention have a core with a refractive index that decreases progressively from the center of the optical fiber to its interface with a cladding (i.e., an "alpha" core profile).

A graded-index profile (i.e., an alpha-index profile) can be described by a relationship between the refractive index value n and the distance r from the center of the optical fiber according to the following equation:

$$n = n_1 \sqrt{1 - 2\Delta \left(\frac{r}{r_1}\right)^\alpha}$$

wherein, $\alpha \geq 1$, and $\alpha$ is a non-dimensional parameter that is indicative of the shape of the index profile;

$n_1$ is the maximum refractive index of the optical fiber's core;

$r_1$ is the radius of the optical fiber's core; and $$\Delta = \frac{(n_1^2 - n_0^2)}{2n_1^2}$$

where $n_0$ is the minimum refractive index of the multimode core.

Exemplary multimode optical fibers with a graded index (i.e., an alpha profile) therefore each have a core profile with a rotational symmetry such that along any radial direction of the optical fiber the value of the refractive index decreases continuously from the center of the optical fiber's core to its periphery. When a multimode light signal propagates in such a graded-index core, the different optical modes experience differing propagation mediums (i.e., because of the varying refractive indices). This, in turn, affects the propagation speed of each optical mode differently. Thus, by adjusting the value of the parameter $\alpha$, it is possible to obtain a group delay time that is virtually equal for all of the modes. Stated differently, the refractive index profile can be modified to reduce or even eliminate intermodal dispersion.

Figure 2:
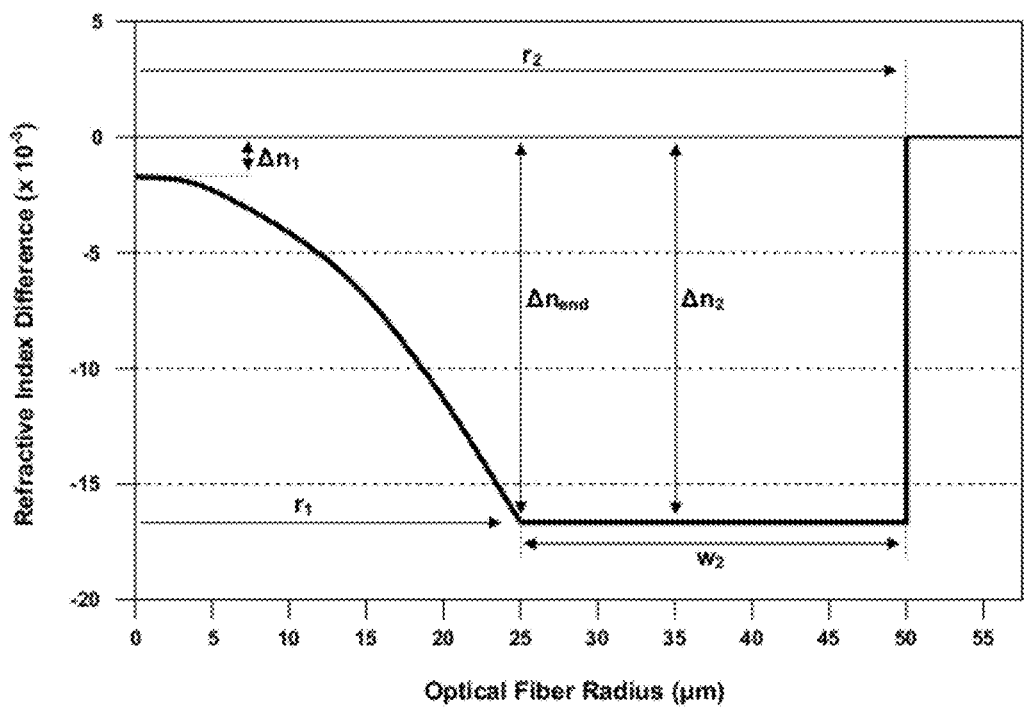
FIG. 2 graphically depicts the set refractive index profile of an exemplary optical fiber according to the present invention.

FIG. 2 graphically depicts the refractive index profile of an exemplary optical fiber according to the present invention. The optical fiber includes a central core that is surrounded by an outer cladding (e.g., an outer optical cladding). For reasons of cost, the outer cladding is typically made of natural silica, but it may also be made of doped silica. As shown, the optical fiber's central core is a glass-based central core having an alpha-index profile (i.e., a graded-index profile) and an outer radius $r_1$. The central core is typically doped with fluorine (F) to reduce the refractive index of the silica.

The central core's alpha-index profile has a minimum refractive index at the central core's outer radius $r_1$ that corresponds to a refractive index difference $\Delta n_{end}$ with respect to the outer cladding. Stated differently, the central core has an alpha-index profile and, at the central core's outer radius $r_1$, a refractive index difference $\Delta n_{end}$ with respect to the outer cladding (e.g., the innermost portion of the outer cladding).

The central core's alpha-index profile also has a maximum refractive index difference $\Delta n_1$ with respect to the outer cladding (e.g., at the center of the central core). The central core's alpha-index profile facilitates the achievement of high bandwidths.

Typically, the optical fiber's central core has a maximum refractive index difference $\Delta n$ of between about 0 and $-5 \times 10^{-3}$ (e.g., between about $-0.05 \times 10^{-3}$ and $-4 \times 10^{-3}$). More typically, the central core's maximum refractive index difference $\Delta n_1$ is between about 0 and $-2 \times 10^{-3}$. The central core's outer radius $r_1$ is typically between about 22.5 microns and 27.5 microns (i.e., 25±2.5 microns). The central core's minimum refractive index $\Delta n_{end}$ is typically between about $-14 \times 10^{-3}$ and $-21 \times 10^{-3}$ (e.g., between $-17 \times 10^{-3}$ and $-19 \times 10^{-3}$). More typically, the central core's minimum refractive index difference $\Delta n_{end}$ is greater than about $-20 \times 10^{-3}$ (e.g., between about $-15 \times 10^{-3}$ and $-16 \times 10^{-3}$). Additionally, the central core's alpha-index profile typically has an alpha-parameter of between about 1.90 and 2.15.

During preform manufacturing, the central core's alpha-index profile is typically created by depositing between about 1000 and 2000 layers of glass (e.g., between 1400 and 1700 layers). In this regard, the central core's alpha-index profile is typically more similar to a true graded-index profile than a step-wise approximation using discrete layers (e.g., between about three and 200 layers of a step-wise decreasing refractive index). Optical fibers having set alpha-index profiles similar to true graded alpha-index profile central cores typically exhibit higher bandwidths than optical fibers with central cores having step-wise approximations of an alpha-index profile.

As depicted in FIG. 2, the exemplary optical fiber also includes an inner cladding. The optical fiber's inner cladding is positioned between the central core and the outer cladding. The inner cladding has an outer radius $r_2$, a width $w_2$, and a refractive index difference $\Delta n_2$ with respect to the outer cladding. The inner cladding is typically doped with fluorine (F) to reduce the refractive index of the silica. The optical fiber's inner cladding generally confines the optical signal within the central core.

The inner cladding's refractive index difference $\Delta n_2$ is typically between about $-14 \times 10^{-3}$ and $-21 \times 10^{-3}$ (e.g., between about $-15 \times 10^{-3}$ and $-16 \times 10^{-3}$). The inner cladding's width $w_2$ is typically between about 5 microns and 37.5 microns (e.g., between about 10 microns and 25 microns). In an exemplary embodiment, the inner cladding's width $w_2$ is about 20 microns or greater. The inner cladding's outer radius $r_2$ is typically between about 30 microns and 62.5 microns (e.g., between 35 microns and 50 microns).

In exemplary embodiments, the inner cladding's outer radius $r_2$ is about 45 microns or greater (e.g., between about 50 microns and 62.5 microns). The present inventors have found that exemplary optical fibers having an inner-cladding outer radius $r_2$ greater than about 45 microns exhibit bandwidths that are less sensitive to fiber length because confinement losses are reduced as compared to optical fibers having inner-cladding outer radii less than 45 microns.

In exemplary embodiments, the inner cladding's refractive index difference $\Delta n_2$ is approximately equal to the central core's minimum refractive index difference $\Delta n_{end}$. That said, the inner cladding's refractive index difference $\Delta n_2$ may be greater than or less than the central core's minimum refractive index difference $\Delta n_{end}$.

FIG. 2 depicts an inner cladding layer having a constant refractive index difference with respect to the outer cladding. Exemplary optical fibers according to the invention, however, may have one or more refractive index differences that vary as a function of radial position (e.g., a trapezoidal, triangular, or alpha profile). For cladding layers having non-constant refractive indices, the respective refractive index differences (e.g., the inner cladding's refractive index difference $\Delta n_2$) refer to the largest refractive index difference between a cladding layer and the outer cladding layer in terms of absolute value.

Furthermore, those of ordinary skill in the art will recognize that the outer cladding typically has a constant refractive index. That said, if the outer cladding has a non-constant refractive index, refractive index differences are typically measured with respect to the innermost portion of the outer cladding (i.e., that portion of the outer cladding that is closest to the central core and that may affect the propagation of optical signals within the optical fiber).

Thus, the exemplary manufactured multimode optical fiber has a graded-index central core surrounded by a cladding layer. The core-cladding interface interrupts the core's alpha-index profile. Consequently, the multimode optical fiber's core never corresponds to a theoretically perfect alpha profile (i.e., the alpha set profile). The outer cladding accelerates the higher-order modes with respect to the lower-order modes. This phenomenon is known as the "cladding effect." In DMD measurements, the responses acquired for the highest radial positions (i.e., nearest the outer cladding) exhibit multiple pulses, which results in a temporal spreading of the response signal. Therefore, bandwidth is diminished by this cladding effect.

An optical fiber's cladding effect may be evaluated using differential-mode-delay measurements acquired with an outer mask. For example, for a 50-micron central core (i.e., a central core diameter of 50±3 microns or radius of 25±1.5 microns), the differential-mode-delay value on the outer mask 0-23 microns can be obtained using the method of the FOTP-220 standard. In this regard, a differential-mode-delay value on the outer mask 0-23 microns (i.e., DMDout, the outer DMD (0-23 microns)) is measured using the DMD method over the radial offset range from the center of the central core (i.e., 0 microns) to 23 microns. In other words, when calculating an optical fiber's outer DMD value, the signals for radial offset values greater than 23 microns are not considered.

Those of ordinary skill in the art will recognize that the dimensions of an outer mask may be modified for optical fibers having larger or smaller core diameters. For example, a mask with larger dimensions (e.g., a larger inner and outer radius) might be used with respect to a multimode optical fiber having a 62.5-micron diameter core. Similarly, a mask with smaller dimensions (e.g., a smaller inner and outer radius) might be used with respect to a multimode optical fiber having a core that is less than 50 microns.

The outer DMD originates from a plot for DMD measured over a length of optical fiber (e.g., over 750 meters of optical fiber). The light source used may be a pulsed titanium-sapphire laser emitting at 850 nanometers. The source emits pulses of less than 40 picoseconds at quarter height, and the RMS (Root Mean Square) spectral width is less than 0.1 nanometer.

Other aspects of an optical fiber's differential mode delay can be evaluated using differential-mode-delay measurements acquired with an inner mask. The differential-mode-delay value on the inner mask 5-18 microns can be obtained using the method of the FOTP-220 standard. In this regard, a differential-mode-delay value on the inner mask 5-18 microns (i.e., DMDin, the inner DMD (5-18 microns)) is measured using the DMD method over the radial offset range of 5 microns from the center of the central core to 18 microns from the center of the central core.

Even further aspects of an optical fiber's differential-mode-delay can be evaluated using differential-mode-delay measurements acquired with a sliding mask in accordance with the method of the FOTP-220 standard. Sliding mask DMD measurements are performed to determine the maximum DMD mask width over any six micron interval between radial offset positions of seven and nineteen microns (i.e., the DMDslid or sliding DMD (7-19 microns)).

As noted, with respect to typical optical fibers, the refractive index of the core $n_c$ is typically greater than the refractive index of the optical cladding $n_g$ (i.e., $n_c > n_g$). The exemplary optical fiber of FIG. 2, however, has a depressed central core (e.g., a fluorine-doped silica core). In this regard, the central core's maximum refractive index difference $\Delta n_1$ is approximately equal to or less than zero. Stated differently, the central core's maximum refractive-index value is equal to or less than the outer cladding's refractive-index value.

In exemplary embodiments, the central core's maximum refractive index difference $\Delta n_1$ is negative. Those having ordinary skill in the art will appreciate that for optical-fiber embodiments in which the entire core possesses a negative refractive index relative to the outer cladding, the greatest refractive-index differential between the central core and the outer cladding occurs at the outermost portion of the central core. In other words, in terms of absolute value, the largest numerical refractive index difference between the central core and the outer cladding occurs at the end of the central core's alpha-index profile. Conversely, in terms of absolute value, the smallest numerical refractive index difference between the central core and the outer cladding occurs at the center of the central core's alpha-index profile.

As previously noted, the outer cladding is typically made of pure silica. That said, in some exemplary embodiments, the optical fiber does not include a pure silica outer cladding. For example, the optical fiber may include a central core surrounded by a fluorine doped cladding (e.g., an inner cladding) that extends to the optical fiber's outermost radius. In such embodiments, refractive index differences are typically measured with respect to pure silica having a refractive-index value of about 1.456. Exemplary optical fibers that include a central core surrounded by a fluorine doped cladding may be manufactured via PCVD deposition using fluorine doped substrate tubes. Alternatively, an exemplary optical fiber may be manufactured using a pure silica deposition tube that is removed after deposition either mechanically or via etching techniques.

The presence of germanium and/or phosphorous tends to promote radiation-induced attenuation. Nonetheless, commonly assigned U.S. Patent Application Publication No. 2012/0039361, which is hereby incorporated by reference in its entirety, demonstrates that germanium doping can reduce an optical fiber's hydrogen-induced attenuation. Thus, the present optical fibers may include a depressed central core (and/or interior cladding layer) that is manufactured with some germanium doping. Some exemplary multimode optical fibers might include a germanium-doped central core having a maximum germanium concentration of 0.1 weight percent or less (e.g., between about 0.01 and 0.05 weight percent germanium). In other words, across the entire width of the central core, the germanium concentration does not exceed 0.1 weight percent.

It has been observed that, in a hydrogen-rich environment at temperatures greater than about 200° C. (e.g., 250° C.), the presence of germanium in the optical fiber's central core can promote hydrogen-induced attenuation. Accordingly, to achieve a depressed central core (e.g., a fluorine-doped silica, alpha-index core), the optical fiber's set profile is typically manufactured without germanium doping or phosphorous doping. Instead, the central core's alpha-index profile is achieved using fluorine-doping to lower the central core's refractive index below the refractive index of the outer cladding.

Exemplary multimode optical fibers usually possess a central core that is substantially free of germanium dopants such that the concentration of germanium within the central core is less than 0.005 weight percent (i.e., less than 50 ppm). In other words, such optical fibers are not intentionally doped with germanium, and any trace amounts of germanium are considered an impurity.

Typically, with respect to a standard multimode optical fiber with a germanium-doped central core, both the calculated overfilled modal bandwidth and the calculated effective modal bandwidth are effectively zero after irradiation up to a cumulated dose of 500 kilograys, because the radiation increases the optical fiber's attenuation to several hundred dB/km.

Figure 3:
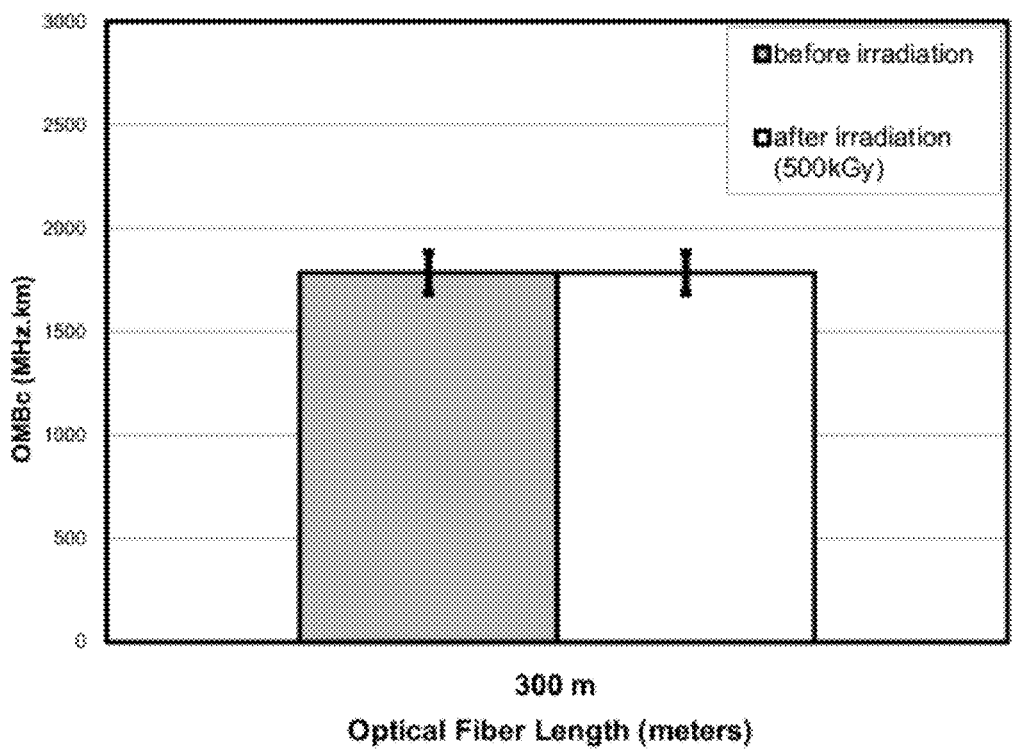
FIG. 3 graphically depicts the calculated overfilled modal bandwidth (OMBc) of a 300-meter length of optical fiber before and after being exposed to 500 kilograys of radiation.
Figure 4:
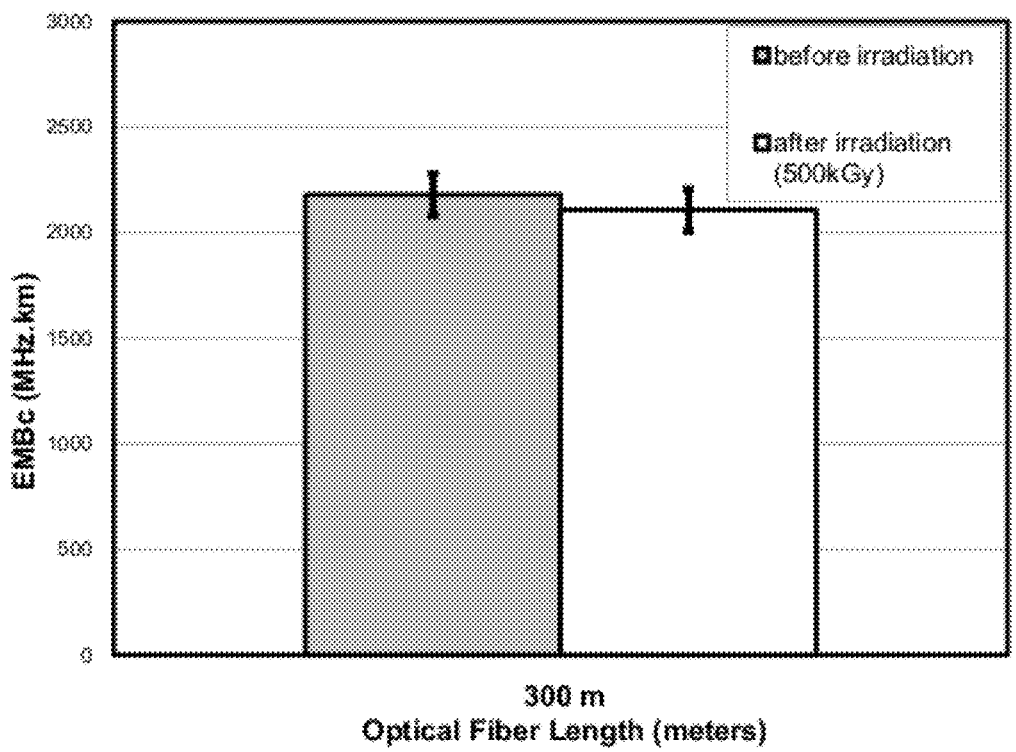
FIG. 4 graphically depicts the calculated effective modal bandwidth (EMBc) of a 300-meter length of optical fiber before and after being exposed to 500 kilograys of radiation.

As shown in FIGS. 3 and 4, respectively, for the 300-meter depressed, alpha-index core optical fiber, 500 kilograys of radiation had no effect on the optical fiber's calculated overfilled modal bandwidth and only slightly reduced the optical fiber's calculated effective modal bandwidth. Thus, the absence of germanium and phosphorous in the exemplary optical fiber's central core improves the optical fiber's resistance to radiation-induced degradation of bandwidth.

Further advantages of the depressed, alpha-index core of the exemplary optical fiber will be better understood with reference to Table 1 (below). Table 1 shows the results of measurements performed on the optical fiber of FIGS. 3 and 4. Again, the measurements were performed before and after the optical fiber was subjected to 500 kilograys of radiation.

The first column of Table 1 provides the length of optical fiber. The second and seventh columns, respectively, show the outer DMD (DMDout) values for the optical fiber before and after radiation. The third and eighth columns, respectively, show the inner DMD (DMDin) values for the optical fiber before and after radiation. The fourth and ninth columns, respectively, show the sliding DMD (DMDslid) values for the optical fiber before and after radiation. The fifth and tenth columns, respectively, show the calculated effective modal bandwidth (EMBc) for the optical fiber before and after radiation. The sixth and eleventh columns, respectively, show the calculated overfilled modal bandwidth (OMBc) for the optical fiber before and after radiation. Each measurement was performed at a wavelength of 850 nanometers.

TABLE 1

| Fiber Length [m] | Before Radiation | | | | | After Radiation | | | | |
|---|---|---|---|---|---|---|---|---|---|---|
| | DMDout [ps/m] | DMDin [ps/m] | DMDslid [ps/m] | EMBc [MHz · km] | OMBc [MHz · km] | DMDout [ps/m] | DMDin [ps/m] | DMDslid [ps/m] | EMBc [MHz · km] | OMBc [MHz · km] |
| 300 | noise | 0.27 | 0.27 | 2179 | 1785 | noise | 0.27 | 0.27 | 2106 | 1785 |

The absence of germanium and phosphorous in the exemplary optical fiber's central core improves two aspects of the optical fiber's performance characteristics. Eliminating the central core's germanium and phosphorous content reduces the optical fiber's overall attenuation. Furthermore, and as noted, the absence of germanium or phosphorous in the central core improves the optical fiber's resistance to radiation.

To illustrate one aspect of a depressed-core optical fiber's improved radiation resistance, FIGS. 3 and 4, respectively, graphically depict the calculated overfilled modal bandwidth (OMBc) and calculated effective modal bandwidth (EMBc) of a 300-meter optical fiber sample before and after radiation. The optical fiber used to generate the data of FIGS. 3 and 4 includes a depressed, alpha-index core and an inner cladding having an outer radius of 35 microns and, therefore, has a refractive index profile similar to the exemplary optical fiber of FIG. 2. The graphs include two bars. The shaded, left-hand bar indicates the optical fiber's bandwidth (i.e., OMBc or EMBc) before radiation. The corresponding unshaded, right-hand bar indicates the optical fiber's bandwidth after being subjected to a radiation dosage of 500 kilograys.

As shown in Table 1, the optical fiber's DMD and bandwidth characteristics are not significantly affected by radiation. The EMBc and OMBc data of Table 1 has been graphically depicted in FIGS. 3 and 4. Thus, Table 1 also illustrates that the absence of germanium and phosphorous in the exemplary optical fiber's central core improves the optical fiber's resistance to radiation-induced degradation of bandwidth.

During the manufacturing of optical fibers via PCVD, chlorine (Cl) is typically incorporated into the optical fiber. For example, FIG. 5 graphically depicts the chemical composition of a comparative, depressed, graded-index multimode optical fiber manufactured using typical chlorine concentrations. The comparative optical fiber includes a 50-micron-diameter central core surrounded by an inner cladding having a width of about 10 microns.

The respective chlorine and fluorine (F) concentrations (i.e., in weight percent) are depicted as a function of the optical fiber's radius. The centrally-positioned vertical axis and the darker, diamond plot line provide the optical fiber's fluorine (F) concentration at particular radial offsets. Similarly, the right-hand vertical axis and the lighter, square plot line provide the optical fiber's chlorine (Cl) concentration at particular radial offsets. As used herein, the recitation of a chlorine or fluorine concentration refers to the weight fraction of elemental chlorine or fluorine, respectively.

Figure 5:
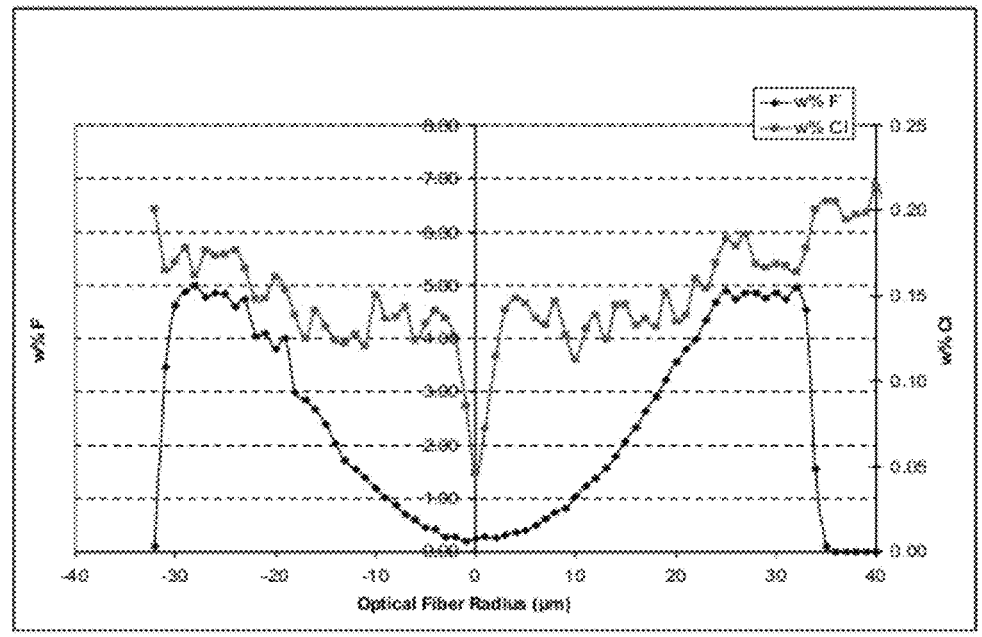
FIG. 5 graphically depicts a comparative optical fiber's fluorine (F) and chlorine (Cl) concentrations as a function of radial offset.

As depicted in FIG. 5, the comparative optical fiber's chlorine concentration is greater than 0.10 weight percent across about 95 percent of the central core's width. Additionally, the comparative optical fiber's average chlorine concentration is about 0.15 weight percent.

Figure 6:
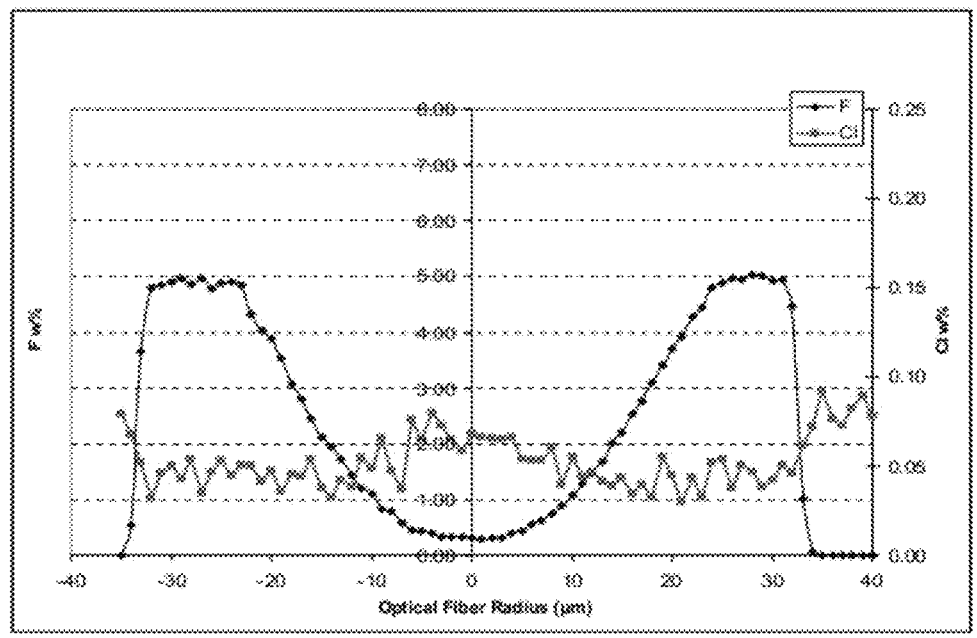
FIG. 6 graphically depicts an exemplary optical fiber's fluorine (F) and chlorine (Cl) concentrations as a function of radial offset.

In contrast, exemplary optical fibers of the present invention typically have low chlorine concentrations. For example, exemplary optical fibers may have average chlorine concentrations that are two to three times less than that of the comparative optical fiber of FIG. 5. FIG. 6 graphically depicts the chemical composition of an exemplary embodiment of a depressed, graded-index multimode optical fiber according to the present invention. The depicted exemplary optical fiber includes a 50-micron-diameter central core surrounded by an inner cladding having a width of about 10 microns.

Again, the chlorine and fluorine concentrations are depicted as a function of the optical fiber's radius. The centrally-positioned vertical axis and the darker, diamond plot line provide the optical fiber's fluorine concentration at particular radial offsets. The right-hand vertical axis and the lighter, square plot line provide the optical fiber's chlorine concentration at particular radial offsets.

As depicted in FIG. 6, across the entire width of the central core, the exemplary optical fiber's chlorine concentration is less than 0.10 weight percent (i.e., the central core has a maximum chlorine concentration of less than 0.10 weight percent). Additionally, across 95 percent of the central core's width, the exemplary optical fiber's chlorine concentration is less than 0.08 weight percent, if not less than 0.07 weight percent. Furthermore, the depicted exemplary optical fiber's average chlorine concentration is about 0.06 weight percent.

More generally, across 95 percent of the central core's width, exemplary optical fibers typically have a chlorine concentration of less than 0.10 weight percent (e.g., less than 0.09 weight percent). In some embodiments, across the entire width of the central core, the exemplary optical fiber's chlorine concentration is less than 0.08 weight percent (e.g., less than 0.07 weight percent). For example, across the entire width of the central core, the exemplary optical fiber's chlorine concentration may be less than 0.06 weight percent (e.g., less than 0.05 weight percent).

Furthermore, in exemplary embodiments, the optical fiber has an average chlorine concentration of less than about 0.10 weight percent (e.g., less than about 0.09 weight percent). Exemplary optical fibers typically have an average chlorine concentration of less than about 0.08 weight percent (e.g., less than 0.07 weight percent). More typically, exemplary optical fibers have an average chlorine concentration of less than 0.06 weight percent (e.g., less than 0.05 weight percent). In some exemplary embodiments, the optical fibers have an average chlorine concentration of less than 0.03 weight percent (e.g., less than 0.01 weight percent).

In exemplary embodiments, at its outer radius, the central core has a minimum flourine concentration of at least about 3 weight percent (e.g., 3.5 to 7.0 weight percent). At the outer radius of the central core, exemplary optical fibers typically have a minimum flourine concentration of 4 weight percent (e.g., 4.5 to 6.0 weight percent). See FIG. 6.

As previously discussed, during typical manufacturing techniques, chlorine is incorporated into an optical fiber. In the context of radiation-rich environments, however, the present inventors have found that high chlorine concentrations actually increase an optical fiber's attenuation.

Figure 7:
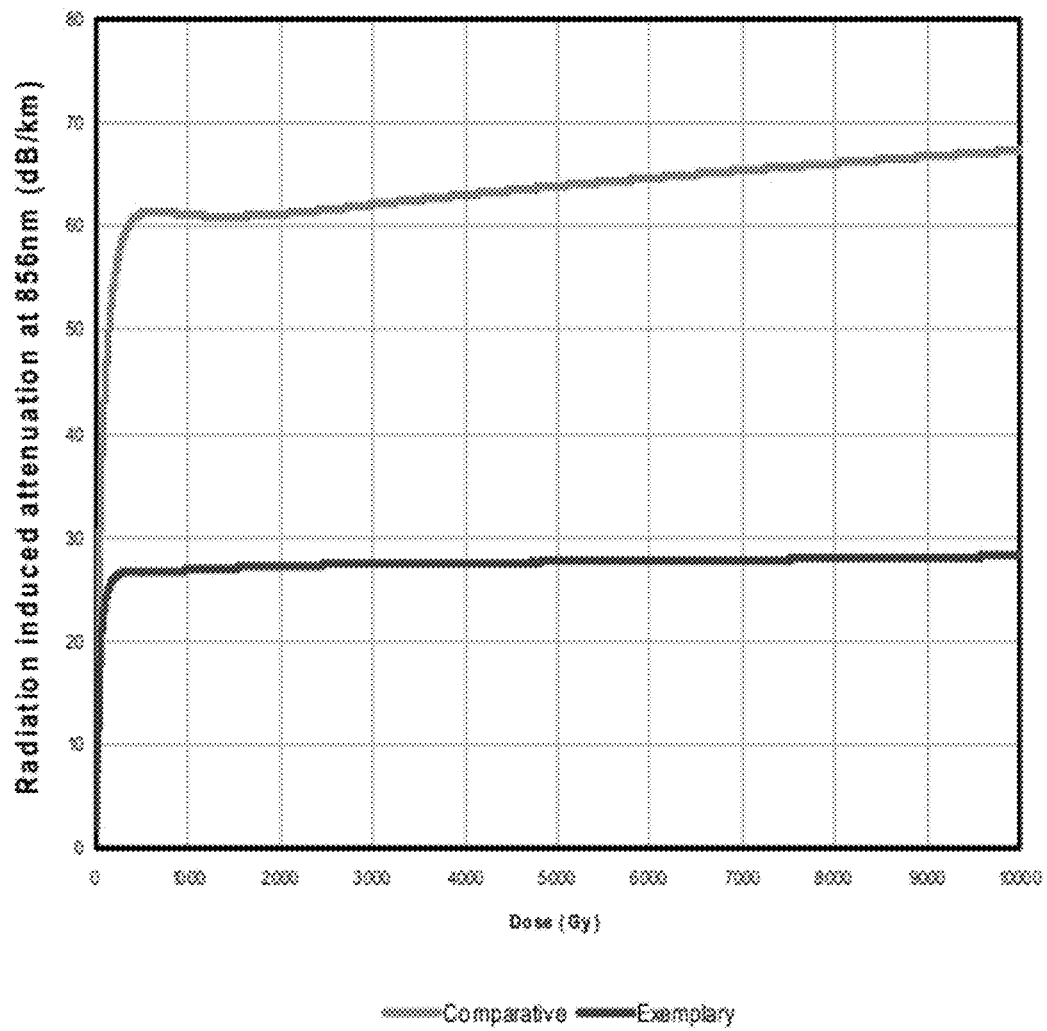
FIG. 7 graphically depicts radiation-induced attenuation as a function of radiation dosage for a comparative optical fiber and an exemplary optical fiber.

FIG. 7 graphically depicts the radiation-induced attenuation (i.e., the induced loss) as a function of radiation dosage for both (i) a comparative optical fiber manufactured using typical techniques and (ii) an exemplary optical fiber according to the present invention. The comparative and exemplary optical fibers are depressed, graded-index multimode optical fibers having refractive index profiles similar to that of FIG. 2. The lighter (and upper) plot line provides the radiation-induced attenuation for the comparative optical fiber. The darker (and lower) plot line provides the radiation-induced attenuation for the exemplary optical fiber.

Figure 8:
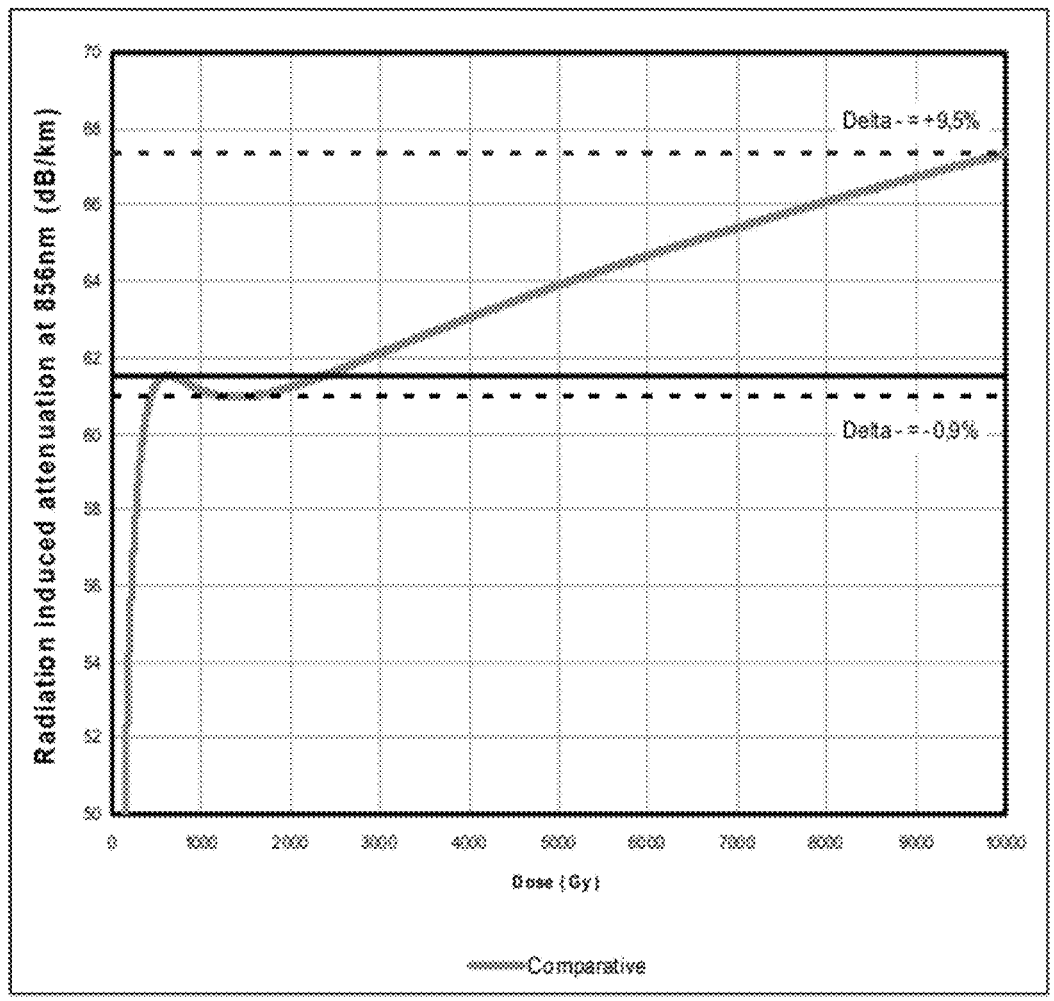
FIG. 8 graphically depicts radiation-induced attenuation as a function of radiation dosage for a comparative optical fiber.
Figure 9:
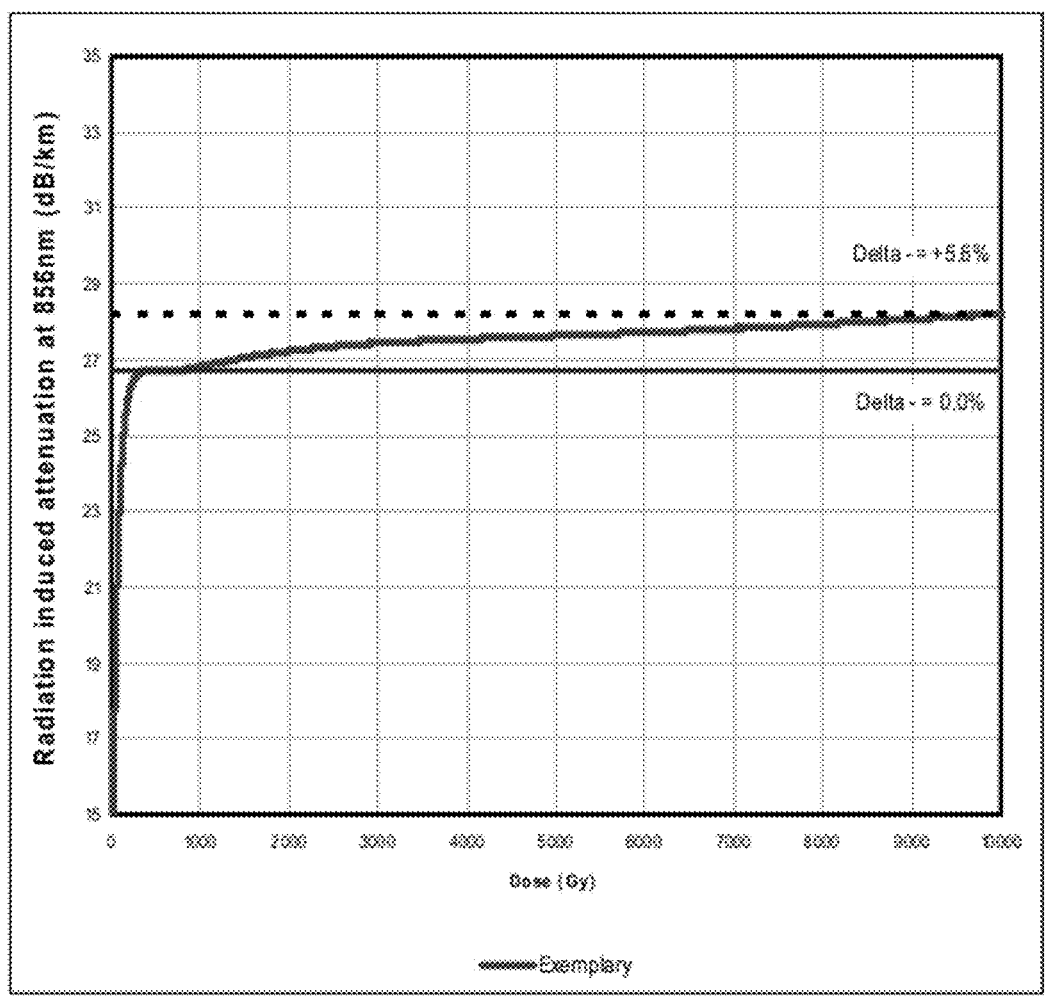
FIG. 9 graphically depicts radiation-induced attenuation as a function of radiation dosage for an exemplary optical fiber.

FIG. 8 graphically depicts the radiation-induced attenuation (i.e., the induced loss) as a function of radiation dosage for the comparative optical fiber. FIG. 9 graphically depicts the radiation-induced attenuation (i.e., the induced loss) as a function of radiation dosage for the exemplary optical fiber.

To generate the plots of FIGS. 7-9, the optical fibers were irradiated for 19 hours using cobalt-60 sources (i.e., $^{60}$Co sources) at a dose rate of 0.15 Gy/s and a temperature of about 24° C. During irradiation, the radiation-induced attenuation of the optical fibers was measured using an LED source emitting at a wavelength of 856 nanometers and approximately −18 dBm (i.e., approximately 16 µW). Further details of the apparatus and testing procedure used to generate the plots of FIGS. 7-9 can be found in the following publication, which is hereby incorporated by reference: Jochen Kuhnhenn, Stefan Klaus Höffgen, and Udo Weinand, *Quality Assurance for Irradiation Tests of Optical Fibers: Uncertainty and Reproducibility*, IEEE Transactions on Nuclear Science, Vol. 56, No. 4, August 2009, at 2160-2166.

As shown in FIGS. 7-9, the exemplary optical fiber exhibited greater resistance to radiation-induced attenuation than did the comparative optical fiber. Indeed, the exemplary optical fiber's radiation-induced attenuation is two to three times less than the comparative optical fiber's radiation-induced attenuation.

In this regard, at a wavelength of 856 nanometers, a temperature of about 24° C., and a radiation dose rate of 0.15 Gy/s, the comparative optical fiber exhibited a radiation-induced attenuation of 61.5 dB/km after a radiation dose of 650 grays. From a dosage of 650 grays to 1500 grays, the comparative optical fiber's radiation-induced attenuation decreases by about 0.9 percent to about 60.95 dB/km. From a dosage of 1500 grays to 10,000 grays, the comparative optical fiber's radiation-induced attenuation increases by 9.5 percent to 67.35 dB/km. The comparative optical fiber's radiation-induced attenuation is relatively unpredictable, because it both increased and decreased during irradiation. Thus, the comparative optical fiber exhibited (i) a high radiation-induced attenuation, (ii) a high radiation-induced attenuation variation, and (iii) an unpredictable radiation-induced attenuation variation.

In contrast, at a wavelength of 856 nanometers, a temperature of about 24° C., and a radiation dose rate of 0.15 Gy/s, the exemplary optical fiber exhibited a radiation-induced attenuation of 26.7 dB/km after a radiation dose of 650 grays. From a dosage of 650 grays to 10,000 grays, the exemplary optical fiber's radiation-induced attenuation increases by 5.6 percent to 28.7 dB/km. Notably, the exemplary optical fiber's radiation-induced attenuation only increased during irradiation. Thus, the exemplary optical fiber exhibited (i) a relatively low radiation-induced attenuation, (ii) a relatively low radiation-induced attenuation variation, and (iii) a more predictable radiation-induced attenuation variation than the comparative optical fiber.

The radiation test results of FIG. 7 illustrate that high chlorine concentrations can increase an optical fiber's attenuation, particularly in radiation-rich environments. Thus, the relatively low concentrations of chlorine in the exemplary optical fibers, coupled with the fact that the fiber does not include dopants such as germanium and/or phosphorus, facilitate the achievement of low fiber-attenuation values in radiation-rich environments.

In some exemplary embodiments, the optical fiber of the present invention possesses a high halogen ratio. As used herein, the concept of a "halogen ratio" refers to the ratio of the weight fraction of elemental fluorine to the weight fraction of elemental chlorine. For instance, the halogen ratio can be expressed at a particular radius of the optical fiber (e.g., the central core's outer radius) or as an average over one or more layers (e.g., the average over the central core). The halogen ratio provides a meaningful comparison between the amount of fluorine dopant used to achieve the optical fiber's refractive index profile and the amount of chlorine incorporated into the optical fiber during the manufacturing process.

The present optical fibers typically possess a halogen ratio at the central core's outer radius of more than about 30 (e.g., between about 50 and 500). To the extent that an optical fiber exhibits circumferential variation with respect to concentrations of elemental fluorine and/or elemental chlorine, mean concentrations may be used to calculate such a radius-dependent halogen ratio.

Figure 12:
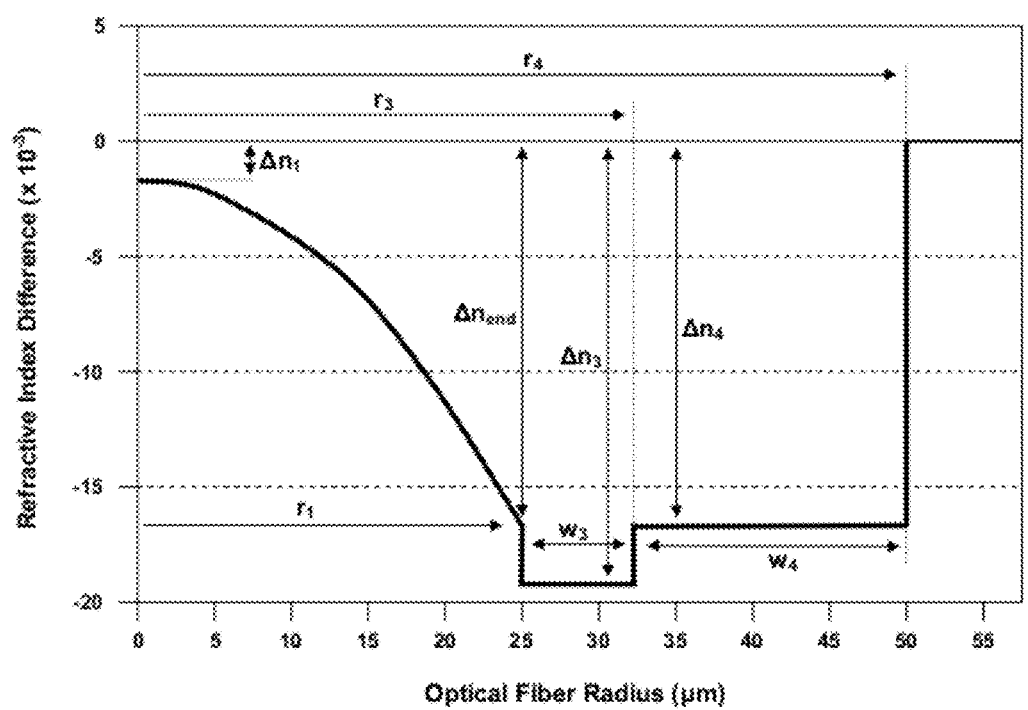
FIG. 12 graphically depicts the set refractive index profile of another exemplary optical fiber according to the present invention.
Figure 13:
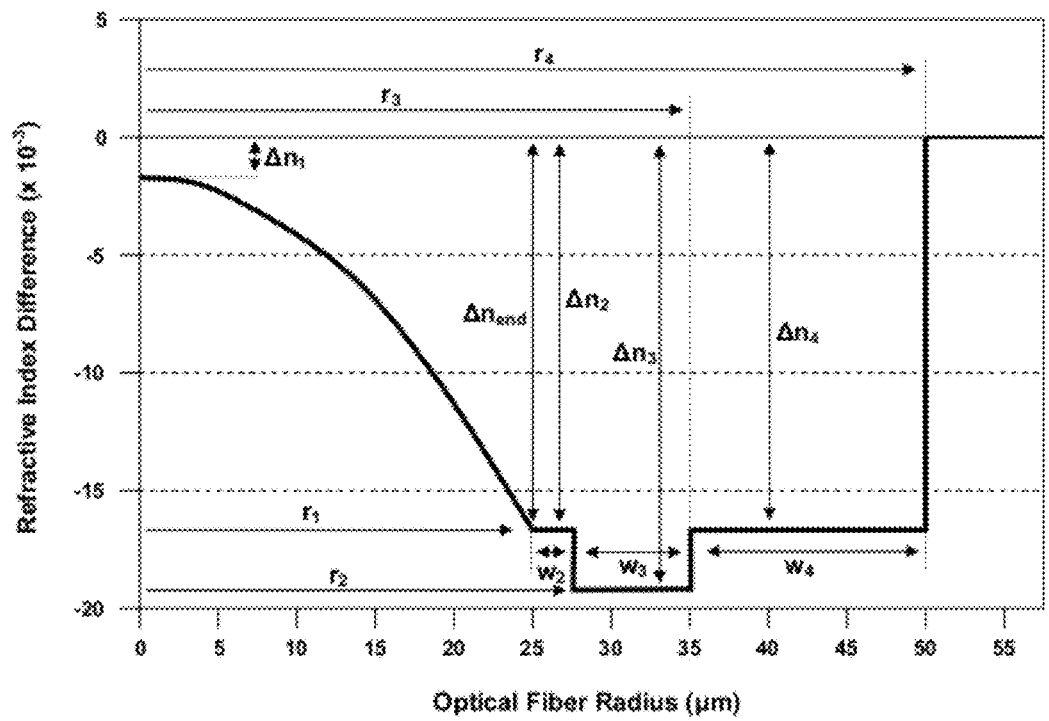
FIG. 13 graphically depicts the set refractive index profile of yet another exemplary optical fiber according to the present invention.

An optical fiber's core-cladding-average halogen ratio is the average halogen ratio within the optical fiber's core and innermost cladding layer (i.e., the cladding layer contiguous with the central core, such as the inner cladding depicted in FIGS. 2 and 13 or the buried trench as depicted in FIG. 12). For example, to calculate a core-cladding-average halogen ratio for an optical fiber having a central core, an inner cladding, and an outer cladding, the average fluorine and chlorine concentrations in the central core and inner cladding would be used. Thus, the core-cladding-average halogen ratio typically represents the halogen ratio for the portion of the optical fiber through which the transmitted signals primarily propagate.

Optical fibers manufactured using conventional techniques typically have core-cladding-average halogen ratios of less than about 18.5. In contrast, exemplary embodiments of the optical fiber typically have a core-cladding-average halogen ratio of more than about 20 (e.g., between about 22 and 300). Typically, the optical fiber has a core-cladding-average halogen ratio of between 25 and 269 (e.g., between about 48 and 240). More typically, the optical fiber has a core-cladding-average halogen ratio of between 53 and 200 (e.g., between about 60 and 140).

An optical fiber's core-average halogen ratio is determined using the average fluorine and chlorine concentrations within the optical fiber's central core. Optical fibers manufactured using conventional techniques typically have core-average halogen ratios of less than about 15. In contrast, exemplary optical fibers typically have a core-average halogen ratio of more than about 20 (e.g., between about 30 and 170).

Higher halogen ratios seem to improve an optical fiber's radiation resistance. In particular, optical fibers with high halogen ratios typically exhibit lower radiation-induced attenuation. Additionally, high halogen ratio optical fibers are typically more resistant to radiation-induced refractive index changes that can compromise the optical fiber's bandwidth. Thus, optical fibers with high halogen ratios typically have high bandwidths and exhibit low attenuation in radiation-rich environments.

Figure 10:
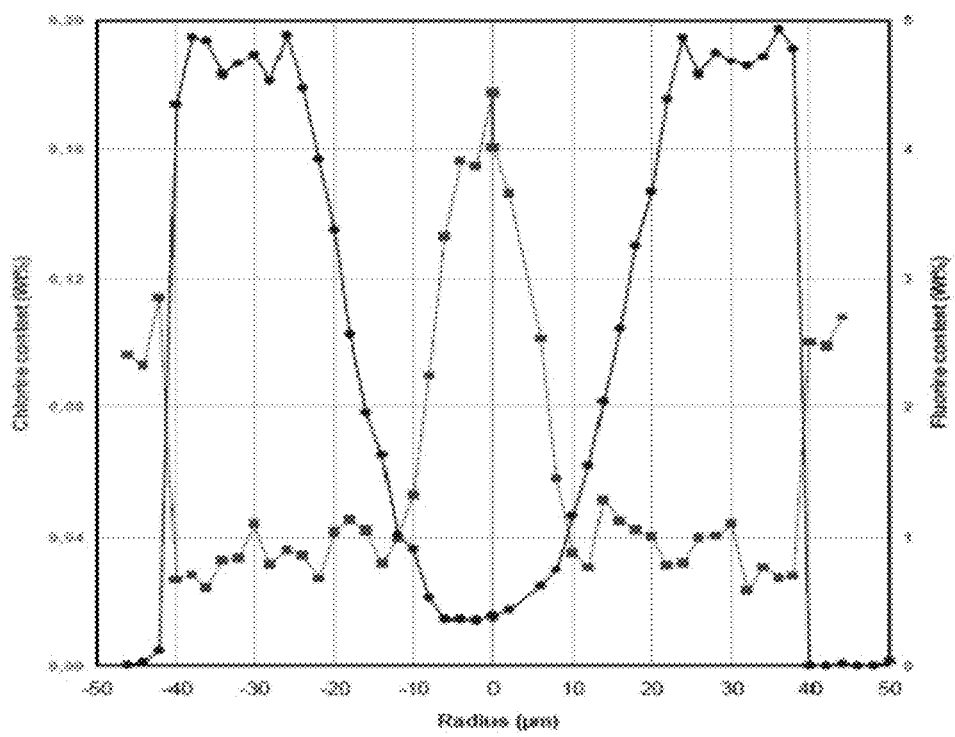
FIG. 10 graphically depicts another exemplary optical fiber's fluorine (F) and chlorine (Cl) concentrations as a function of radial offset.
Figure 11:
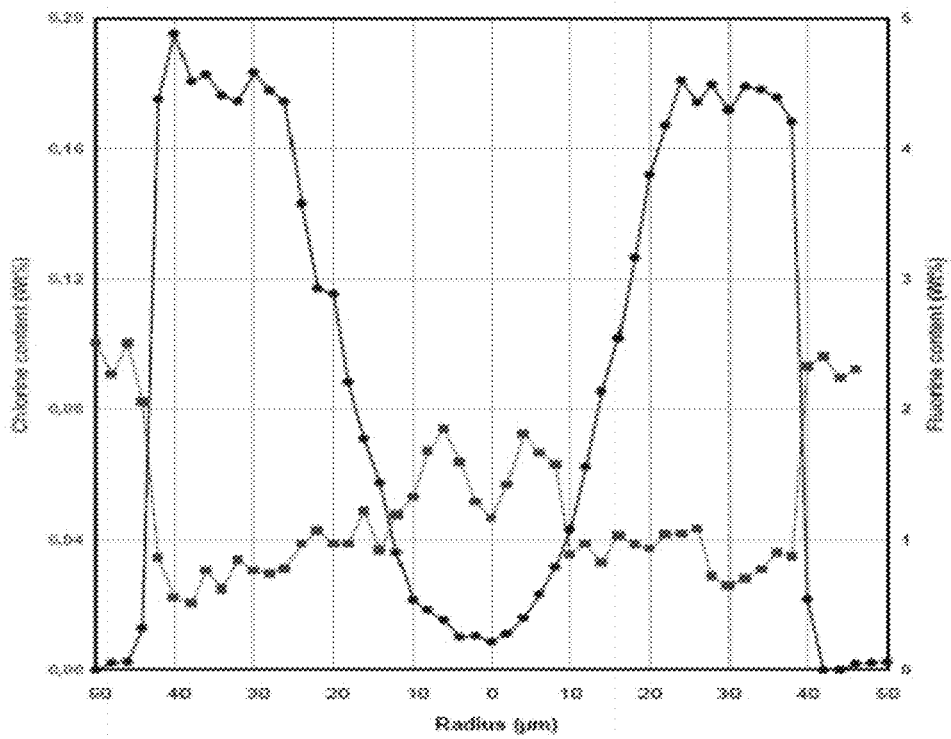
FIG. 11 graphically depicts yet another exemplary optical fiber's fluorine (F) and chlorine (Cl) concentrations as a function of radial offset.

For example, FIGS. 10 and 11 graphically depict the fluorine (F) and chlorine (Cl) concentrations as a function of radial offset for two exemplary optical fibers. The exemplary optical fibers include a 50-micron-diameter central core surrounded by an inner cladding having a width of about 15 microns.

The respective chlorine and fluorine concentrations (i.e., in weight percent) are depicted as a function of the optical fiber's radius. The left-hand vertical axis and the lighter, square plot line provide the optical fiber's chlorine concentration at particular radial offsets. Similarly, the right-hand vertical axis and the darker, circle plot line provide the optical fiber's fluorine concentration at particular radial offsets. As used herein, the recitation of a chlorine or fluorine concentration refers to the weight fraction of elemental chlorine or fluorine, respectively.

The optical fiber of FIG. 10 has an average chlorine concentration in its core of 0.10 weight percent, and the optical fiber of FIG. 11 has an average chlorine concentration in its core of 0.05 weight percent. The optical fibers of FIGS. 10 and 11 have comparable average fluorine concentrations in their respective cores. Thus, the optical fiber of FIG. 11 has a core-average halogen ratio that is approximately two times (i.e., 2×) the core-average halogen ratio of the optical fiber of FIG. 10.

The optical fibers of FIGS. 10 and 11 were irradiated using cobalt-60 sources (i.e., $^{60}$Co sources) at a dose rate of about 1.25 Gy/s and a temperature of about 45° C. up to a cumulative dose of 2.35 MGy (i.e., 2.35 megagrays). After irradiation, the radiation-induced attenuation of the optical fibers was measured. At a wavelength of 1300 nanometers, the optical fiber of FIG. 10 exhibited 50 percent more (i.e., 1.5×) radiation-induced attenuation than the optical Fiber of FIG. 11. Furthermore, at a wavelength of 850 nanometers, the optical fiber of FIG. 10 exhibited 100 percent more (i.e., 2×) radiation-induced attenuation than the optical Fiber of FIG. 11. Thus, increasing an optical fiber's core-average halogen ratio seems to reduce an optical fiber's radiation-induced attenuation.

According to one embodiment, the optical fiber of the present invention complies with ITU-T Recommendation G.651.1 with the exception of its specifications regarding chromatic dispersion. As such, it has a central-core diameter of 50 microns (i.e., a central-core radius $r_1$ of 25 microns) and/or a numerical aperture of 0.2±0.015.

In another aspect, the present invention embraces a multimode optical system that includes at least a portion of an optical fiber as disclosed herein. In particular, the optical system can exhibit a data rate of at least 10 Gb/s over at least 100 meters (e.g., 300 meters). In this regard, exemplary embodiments of the present optical system comply with the OM3 and OM4 standards with the exception of their respective specifications regarding chromatic dispersion.

In some exemplary embodiments, optical fibers of the present invention include a buried trench positioned between the central core and the outer cladding. Typically, the optical fiber's buried trench may immediately surround an inner cladding. Alternatively, the optical fiber may include a buried trench that immediately surrounds the central core. In exemplary embodiments that include a buried trench immediately surrounding the central core, the optical fiber may or may not include an intermediate cladding (e.g., an intermediate cladding positioned between the buried trench and the outer cladding).

For exemplary embodiments including a buried trench, the buried trench has a width $w_3$, an outer radius $r_3$, and a refractive index difference $\Delta n_3$ with respect to the outer cladding. Typically, the term "buried trench" is used to describe a radial portion of an optical fiber that has a refractive index that is substantially less than the refractive index of the outer cladding.

Generally speaking, a refractive index difference can also be expressed as a percentage using the following equation:

$$\Delta\%(r) = \frac{100 \times (n(r)^2 - n_{cladding}^2)}{2n(r)^2}$$

where n(r) is the comparative refractive-index value as a function of radial position (e.g., the refractive index $n_3$ of a buried trench), and $n_{cladding}$ is the refractive-index value of the outer cladding. Those of ordinary skill in the art will recognize that this equation can be used if the refractive index varies over a given section of the optical fiber (i.e., the refractive-index value varies as a function of radial position) or if the refractive index is constant over a given section.

Thus, a constant refractive index difference with respect to an outer cladding can be expressed as a percentage using the following equation:

$$\Delta\% = \frac{100 \times (n^2 - n_{cladding}^2)}{2n^2}$$

where n is the comparative refractive-index value (e.g., the refractive index $n_3$ of a buried trench), and $n_{cladding}$ is the refractive-index value of the outer cladding.

As used herein, the volume v of a buried trench is defined by the following equation:

$$v = \left| 2\pi \times \int_{r_{int}}^{r_{ext}} \Delta\%(r) \times r \times dr \right|$$

in which $r_{int}$ and $r_{ext}$ are the inner radius and outer radius of the buried trench, respectively, and $\Delta\%(r)$ is the buried trench's refractive index difference with respect to the outer cladding expressed in terms of percentage. Those of ordinary skill in the art will recognize that this equation can be used for both rectangular and non-rectangular trenches.

If a buried trench has a rectangular shape (i.e., a step index profile), the equation (above) can be simplified to the following equation:

$$v = |\Delta\% \times \pi \times (r_{ext}^2 - r_{int}^2)|$$

in which $r_{ext}$ and $r_{int}$ are the outer radius and inner radius of the buried trench, respectively, and $\Delta\%$ is the buried trench's refractive index difference with respect to the outer cladding expressed as a percentage.

As noted, exemplary optical fibers may include a buried trench immediately surrounding the central core. FIG. 12 graphically depicts the set refractive index profile of an exemplary optical fiber that includes a buried trench immediately surrounding the central core. The optical fiber includes a central core that is surrounded by an outer cladding (e.g., an outer optical cladding). For reasons of cost, the outer cladding is typically made of natural silica, but it may also be made of doped silica. As shown, the optical fiber's central core is a glass-based central core having an alpha-index profile (i.e., a graded-index profile) and an outer radius $r_1$. The central core is typically doped with fluorine to reduce the refractive index of the silica.

The central core's alpha-index profile has a minimum refractive index at the central core's outer radius $r_1$ that corresponds to a refractive index difference $\Delta n_{end}$ with respect to the outer cladding. Stated differently, the central core has an alpha-index profile and, at the central core's outer radius $r_1$, a refractive index difference $\Delta n_{end}$ with respect to the outer cladding (e.g., the innermost portion of the outer cladding).

The central core's alpha-index profile also has a maximum refractive index difference $\Delta n_1$ with respect to the outer cladding (e.g., at the center of the central core). The central core's alpha-index profile facilitates the achievement of high bandwidths.

Typically, the optical fiber's central core has a maximum refractive index difference $\Delta n_1$ of between about 0 and $-4 \times 10^{-3}$. More typically, the central core's maximum refractive index difference $\Delta n_1$ is between about $-0.1 \times 10^{-3}$ and $-1.5 \times 10^{-3}$. The central core's outer radius $r_1$ is typically between about 22.5 microns and 27.5 microns (i.e., 25±2.5 microns). The central core's minimum refractive index $\Delta n_{end}$ is typically between about $-14 \times 10^{-3}$ and $-21 \times 10^{-3}$ (e.g., between about $-17 \times 10^{-3}$ and $-19 \times 10^{-3}$). More typically, the central core's minimum refractive index difference $\Delta n_{end}$ is greater than about $-18 \times 10^{-3}$ (e.g., between about $-15 \times 10^{-3}$ and $-16 \times 10^{-3}$). Additionally, the central core's alpha-index profile typically has an alpha-parameter of between about 1.9 and 2.1.

As depicted in FIG. 12, the exemplary optical fiber also includes a buried trench immediately surrounding the central core. The buried trench has a width $w_3$, an outer radius $r_3$, and a refractive index difference $\Delta n_3$ with respect to the outer cladding. The buried trench is typically doped with fluorine to reduce the refractive index of the silica. The buried trench has a width $w_3$, an outer radius $r_3$, and a refractive index difference $\Delta n_3$ with respect to the outer cladding. In exemplary embodiments, the buried trench's refractive index difference $\Delta n_3$ is between about $-15 \times 10^{-3}$ and $-36 \times 10^{-3}$ (e.g., between about $-18 \times 10^{-3}$ and $-34 \times 10^{-3}$). Typically, the buried trench's refractive index difference $\Delta n_3$ is between about $-16 \times 10^{-3}$ and $-30 \times 10^{-3}$ (e.g., between about $-19 \times 10^{-3}$ and $-21 \times 10^{-3}$).

In accordance with the foregoing, exemplary trench-assisted, multimode optical fibers might possess buried trenches having fluorine concentrations of at least about 5 weight percent (e.g., 5.5 to 6.5 weight percent), such as between about 6 weight percent and 7 weight percent. Typically, doping silica with 1 weight percent fluorine yields a refractive index difference with pure silica of about $-3 \times 10^{-3}$.

In some exemplary embodiments, the difference between the buried trench's refractive index difference $\Delta n_3$ and the central core's minimum refractive index $\Delta n_{end}$ (i.e., $\Delta n_3 - \Delta n_{end}$) is between about $-1 \times 10^{-3}$ and $-15 \times 10^{-3}$ (e.g., between about $-2 \times 10^{-3}$ and $-14 \times 10^{-3}$). The difference between the buried trench's refractive index difference $\Delta n_3$ and the central core's minimum refractive index $\Delta n_{end}$ (i.e., $\Delta n_3 - \Delta n_{end}$) is typically between about $-3 \times 10^{-3}$ and $-13 \times 10^{-3}$ (e.g., between about $-3 \times 10^{-3}$ and $-10 \times 10^{-3}$ or between about $-4 \times 10^{-3}$ and $-12 \times 10^{-3}$). More typically, the difference between the buried trench's refractive index difference $\Delta n_3$ and the central core's minimum refractive index $\Delta n_{end}$ (i.e., $\Delta n_3 - \Delta n_{end}$) is between about $-5 \times 10^{-3}$ and $-11 \times 10^{-3}$ (e.g., between about $-6 \times 10^{-3}$ and $-10 \times 10^{-3}$).

The buried trench's width $w_3$ may be between about 0.5 micron and 10 microns (e.g., between about 2 microns and 8 microns). Typically, the buried trench's width $w_3$ is between about 3 microns and 7 microns (e.g., between about 4 microns and 6 microns). The buried trench's outer radius $r_3$ is typically between about 23 microns and 38 microns (e.g., between about 26 microns and 35 microns). More typically, the buried trench's outer radius $r_3$ is between about 28 microns and 33 microns (e.g., between about 30 microns and 32 microns). In some exemplary embodiments, the optical fiber of the present invention includes a buried trench having a volume $v_3$ of about 260%·µm² or more (e.g., between about 280%·µm² and 450%·µm²). More typically, the buried trench has a volume $v_3$ of between about 300%·µm² and 425%·µm² (e.g., between about 350%·µm² and 400%·µm²). The buried trench is typically doped with fluorine (F) to reduce the refractive index of the silica.

As depicted in FIG. 12, at the value of $r=r_1$, there is a distinct, discontinuous drop in the optical fiber's refractive index from the central core's minimum refractive index $\Delta n_{end}$ to the buried trench's refractive index difference $\Delta n_3$. That said, in exemplary embodiments, the drop in the optical fiber's refractive index at the central core's outer radius $r_1$ may be continuous. For example, the central core's alpha-index profile may include a refractive index difference $\Delta n_{end}$ that corresponds to the buried trench's refractive index difference $\Delta n_3$.

The exemplary optical fiber of FIG. 12 also includes an intermediate cladding positioned between the buried trench and the outer cladding. The intermediate cladding has an outer radius $r_4$, a width $w_4$, and a refractive index difference $\Delta n_4$ with respect to the outer cladding. The intermediate cladding is typically doped with fluorine to reduce the refractive index of the silica.

In exemplary embodiments, the intermediate cladding's refractive index difference $\Delta n_4$ is approximately equal to the central core's minimum refractive index difference $\Delta n_{end}$. That said, the intermediate cladding's refractive index difference $\Delta n_4$ may be greater than or less than the central core's minimum refractive index difference $\Delta n_{end}$.

The optical fiber's intermediate cladding typically has a width $w_4$ of between about 8 microns and 40 microns (e.g., between about 10 microns and 25 microns). The intermediate cladding's refractive index difference $\Delta n_4$ is typically between about $-14 \times 10^{-3}$ and $-21 \times 10^{-3}$ (e.g., between about $-17 \times 10^{-3}$ and $-19 \times 10^{-3}$). More typically, the intermediate cladding's refractive index difference $\Delta n_4$ is greater than about $-20 \times 10^{-3}$ (e.g., between about $-15 \times 10^{-3}$ and $-16 \times 10^{-3}$). The intermediate cladding's outer radius $r_4$ is typically between about 30 microns and 62.5 microns (e.g., between about 35 microns and 50 microns).

In exemplary embodiments, the intermediate cladding's outer radius $r_4$ is about 45 microns or greater (e.g., between about 50 microns and 62.5 microns). The present inventors have found that exemplary optical fibers having an intermediate-cladding outer radius $r_2$ greater than about 45 microns exhibit bandwidths that are less sensitive to fiber length because confinement losses are reduced as compared to optical fibers having intermediate-cladding outer radii less than 45 microns.

FIG. 13 graphically depicts the set refractive index profile of yet another exemplary optical fiber that includes a buried trench. The optical fiber includes a central core that is surrounded by an outer cladding (e.g., an outer optical cladding). As shown, the optical fiber's central core is a glass-based central core having an alpha-index profile (i.e., a graded-index profile), an outer radius $r_1$, a minimum refractive index $\Delta n_{end}$, and a maximum refractive index difference $\Delta n_1$.

In this exemplary embodiment, the optical fiber's central core typically has a maximum refractive index difference $\Delta n_1$ of between about 0 and $-5 \times 10^{-3}$ (e.g., between about $-0.05 \times 10^{-3}$ and $-4 \times 10^{-3}$). More typically, the central core's maximum refractive index difference $\Delta n_1$ is between about 0 and $-2 \times 10^{-3}$. The central core's outer radius $r_1$ is typically between about 22.5 microns and 27.5 microns (i.e., 25±2.5 microns). The central core's minimum refractive index $\Delta n_{end}$ is typically between about $-14 \times 10^{-3}$ and $-21 \times 10^{-3}$ (e.g., between about $-17 \times 10^{-3}$ and $-19 \times 10^{-3}$). More typically, the central core's minimum refractive index difference $\Delta n_{end}$ is greater than about $-20 \times 10^{-3}$ (e.g., between about $-15 \times 10^{-3}$ and $-16 \times 10^{-3}$). Additionally, the central core's alpha-index profile typically has an alpha-parameter of between about 1.90 and 2.15.

As depicted in FIG. 13, the exemplary optical fiber also includes an inner cladding (e.g., a ring). The optical fiber's inner cladding is positioned between the central core and the outer cladding. The inner cladding has an outer radius $r_2$, a width $w_2$, and a refractive index difference $\Delta n_2$ with respect to the outer cladding. The inner cladding is typically doped with fluorine to reduce the refractive index of the silica.

The inner cladding's refractive index difference $\Delta n_2$ is typically between about $-14 \times 10^{-3}$ and $-21 \times 10^{-3}$ (e.g., between about $-17 \times 10^{-3}$ and $-19 \times 10^{-3}$). More typically, the inner cladding's refractive index difference $\Delta n_2$ is greater than about $-20 \times 10^{-3}$ (e.g., between about $-15 \times 10^{-3}$ and $-16 \times 10^{-3}$). The inner cladding's width $w_2$ is typically between about 0.5 micron and 10 microns (e.g., between about 1 micron and 9 microns). More typically, the inner cladding's width $w_2$ is between about 2 microns and 7 microns (e.g., between about 4 microns and 6 microns). The inner cladding's outer radius $r_2$ is typically between about 23 microns and 38 microns (e.g., between about 26 microns and 35 microns). More typically, the inner cladding's outer radius $r_2$ is between about 28 microns and 33 microns (e.g., between about 30 microns and 32 microns).

In exemplary embodiments, the inner cladding's refractive index difference $\Delta n_2$ is approximately equal to the central core's minimum refractive index difference $\Delta n_{end}$. That said, the inner cladding's refractive index difference $\Delta n_2$ may be greater than or less than the central core's minimum refractive index difference $\Delta n_{end}$.

As depicted in FIG. 13, the exemplary optical fiber further includes a buried trench immediately surrounding the inner cladding. The buried trench has a width $w_3$, an outer radius $r_3$, and a refractive index difference $\Delta n_3$ with respect to the outer cladding. In exemplary embodiments, the buried trench's refractive index difference $\Delta n_3$ is between about $-15 \times 10^{-3}$ and $-36 \times 10^{-3}$ (e.g., between about $-18 \times 10^{-3}$ and $-34 \times 10^{-3}$). Typically, the buried trench's refractive index difference $\Delta n_3$ is between about $-16 \times 10^{-3}$ and $-30 \times 10^{-3}$ (e.g., between about $-19 \times 10^{-3}$ and $-21 \times 10^{-3}$).

In some exemplary embodiments, the difference between the buried trench's refractive index difference $\Delta n_3$ and the inner cladding's refractive index difference $\Delta n_2$ (i.e., $\Delta n_3 - \Delta n_2$) is between about $-1 \times 10^{-3}$ and $-15 \times 10^{-3}$ (e.g., between about $-2 \times 10^{-3}$ and $-14 \times 10^{-3}$). The difference between the buried trench's refractive index difference $\Delta n_3$ and the inner cladding's refractive index difference $\Delta n_2$ (i.e., $\Delta n_3 - \Delta n_2$) is typically between about $-3 \times 10^{-3}$ and $-13 \times 10^{-3}$ (e.g., between about $-3 \times 10^{-3}$ and $-10 \times 10^{-3}$ or between about $-4 \times 10^{-3}$ and $-12 \times 10^{-3}$). More typically, the difference between the buried trench's refractive index difference $\Delta n_3$ and the inner cladding's refractive index difference $\Delta n_2$ (i.e., $\Delta n_3 - \Delta n_2$) is between about $-5 \times 10^{-3}$ and $-11 \times 10^{-3}$ (e.g., between about $-6 \times 10^{-3}$ and $-10 \times 10^{-3}$).

The buried trench's width $w_3$ may be between about 0.5 micron and 10 microns (e.g., between about 2 microns and 8 microns). Typically, the buried trench's width $w_3$ is between about 3 microns and 7 microns (e.g., between about 4 microns and 6 microns). The buried trench's outer radius $r_3$ is typically between about 23 microns and 38 microns (e.g., between about 26 microns and 35 microns). More typically, the buried trench's outer radius $r_3$ is between about 28 microns and 33 microns (e.g., between about 30 microns and 32 microns). In some exemplary embodiments, the optical fiber of the present invention includes a buried trench having a volume $v_3$ of about 260%·µm² or more (e.g., between about 280%·µm² and 450%·µm²). More typically, the buried trench has a volume $v_3$ of between about 300%·µm² and 425%·µm² (e.g., between about 350%·µm² and 400%·µm²). The buried trench is typically doped with fluorine to reduce the refractive index of the silica.

The exemplary optical fiber of FIG. 13 also includes an intermediate cladding positioned between the buried trench and the outer cladding. The intermediate cladding has an outer radius $r_4$, a width $w_4$, and a refractive index difference $\Delta n_4$ with respect to the outer cladding. The intermediate cladding is typically doped with fluorine to reduce the refractive index of the silica.

In exemplary embodiments, the intermediate cladding's refractive index difference $\Delta n_4$ is approximately equal to the central core's minimum refractive index difference $\Delta n_{end}$. That said, the intermediate cladding's refractive index difference $\Delta n_4$ may be greater than or less than the central core's minimum refractive index difference $\Delta n_{end}$.

The optical fiber's intermediate cladding typically has a width $w_4$ of between about 8 microns and 40 microns (e.g., between about 10 microns and 25 microns). The intermediate cladding's refractive index difference $\Delta n_4$ is typically between about $-14 \times 10^{-3}$ and $-21 \times 10^{-3}$ (e.g., between about $-17 \times 10^{-3}$ and $-19 \times 10^{-3}$). More typically, the intermediate cladding's refractive index difference $\Delta n_4$ is greater than about $-20 \times 10^{-3}$ (e.g., between about $-15 \times 10^{-3}$ and $-16 \times 10^{-3}$). The intermediate cladding's outer radius $r_4$ is typically between about 30 microns and 62.5 microns (e.g., between about 35 microns and 50 microns).

In exemplary embodiments, the intermediate cladding's outer radius $r_4$ is about 45 microns or greater (e.g., between about 50 microns and 62.5 microns). The present inventors have found that exemplary optical fibers having an intermediate-cladding outer radius $r_2$ greater than about 45 microns exhibit bandwidths that are less sensitive to fiber length because confinement losses are reduced as compared to optical fibers having intermediate-cladding outer radii less than 45 microns.

As noted, some exemplary embodiments of the optical fiber include an inner cladding immediately surrounding the central core and a buried trench immediately surrounding the inner cladding. In such optical fiber embodiments, the inner cladding's refractive index difference $\Delta n_2$ may be equal to the central core's minimum refractive index difference $\Delta n_{end}$. In alternative embodiments, however, the alpha-index profile of the central core is interrupted at a refractive index difference $\Delta n_{end}$ that is greater than the minimum refractive index used to determine the shape of the alpha-index profile. As used herein, an alpha-index profile is considered to be interrupted if the central core has a minimum refractive-index value $n_{end}$ that is greater than the minimum refractive-index value $n_0$ (i.e., the theoretical minimum refractive-index value). Those of ordinary skill in the art will appreciate that $n_{end}$ is the minimum refractive-index value, whereas $\Delta n_{end}$ is the minimum refractive index difference.

Without being bound to any particular theory, the present inventors have found that a buried trench can facilitate a reduction in the optical fiber's bending losses (i.e., macrobending losses). In this regard, at a wavelength of 850 nanometers, exemplary optical fibers including a buried trench have bending losses for two turns with a bend radius of 15 millimeters of less than 0.11 dB (e.g., less than 0.06 dB); bending losses for two turns with a bend radius of 10 millimeters of less than 0.10 dB (e.g., less than 0.9 dB); bending losses for two turns with a bend radius of 7.5 millimeters of less than 0.15 dB (e.g., less than 0.10 dB); and bending losses for two turns with a bend radius of 5 millimeters of less than 0.18 dB (e.g., less than 0.15 dB).

Figure 14:
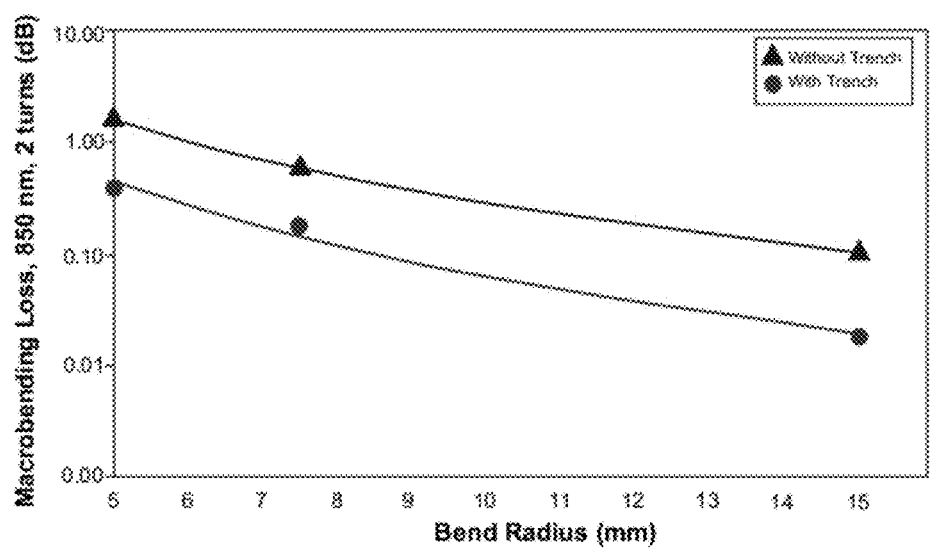
FIG. 14 graphically depicts the macrobending losses at a wavelength of 850 nanometers for two turns around a given bend radius for two exemplary optical fibers.

Indeed, FIG. 14 graphically depicts the macrobending losses at a wavelength of 850 nanometers for two turns around a given bend radius for two exemplary optical fibers. One of the exemplary optical fibers includes a buried trench immediately surrounding an inner cladding (i.e., a set profile similar to FIG. 13), while the other exemplary optical fiber does not include a buried trench. The curve designated with circles shows the bending losses of the exemplary optical fiber that includes a buried trench. The curve designated with triangles shows the bending losses of the exemplary optical fiber that does not include a buried trench. As depicted, the exemplary optical fiber that includes a buried trench has bending losses at a given radius that are at least three to five times less than the bending losses of the exemplary optical fiber without a buried trench.

As used herein, an optical fiber "without a buried trench" refers to an optical fiber that has an otherwise identical refractive index profile as the optical fiber to which it is being compared, except that the trench is replaced with a material having a refractive index that is the same as an adjacent cladding layer (e.g., an inner cladding, an intermediate cladding, or an outer cladding).

Macrobending losses may be measured according to the IEC 60793-1-47 and IEC 61280-4-1 International Standards, each of which is hereby incorporated by reference in its entirety. In this regard, the measurement is typically performed on a ball-bearing set-up with small diameter bends. Typically, the launch conditions used are those described in the IEC 61280-4-1 International Standard.

In another aspect, the present invention embraces a method of manufacturing an optical fiber preform via an internal chemical vapor deposition technique (CVD). The CVD process involves the deposition of doped or undoped, reactive, glass-forming gases on the inside of a hollow substrate tube. Such reactive gases, which are supplied on one side of the substrate tube (i.e., the supply side), form a glass layer on the interior of the substrate tube under certain process conditions. Exemplary methods include supplying the interior of the substrate tube with higher levels of oxygen (i.e., $O_2$) than are used in a conventional internal chemical vapor deposition. In some exemplary embodiments, the interior of the substrate tube is supplied with oxygen at a flow rate that is approximately 1.8 times higher than in a conventional CVD deposition process.

An energy source is reciprocated between two reversal points along the substrate tube to promote the formation of a glass layer. The energy source, such as a plasma generator, supplies high-frequency energy to generate a plasma in the interior of the substrate tube, under which conditions the reactive, glass-forming gases will react (i.e., a plasma CVD technique).

In exemplary embodiments, a plasma generator is used to perform a plasma enhanced CVD technique (i.e., a PCVD deposition). PCVD deposition techniques typically provide higher fluorine deposition efficiencies and higher fluorine concentrations than conventional CVD processes.

The present optical fibers may facilitate the reduction in overall optical-fiber diameter. As will be appreciated by those having ordinary skill in the art, a reduced-diameter optical fiber is cost-effective, requiring less raw material. Moreover, a reduced-diameter optical fiber requires less deployment space (e.g., within a buffer tube and/or fiber optic cable), thereby facilitating increased fiber count and/or reduced cable size.

Those having ordinary skill in the art will recognize that an optical fiber with a primary coating (and an optional secondary coating and/or ink layer) typically has an outer diameter of between about 235 microns and about 265 microns (μm). The component glass fiber itself (i.e., the glass core and surrounding cladding layers) typically has a diameter of about 125 microns, such that the total coating thickness is typically between about 55 microns and 70 microns.

With respect to the present optical fiber, the component glass fiber typically has an outer diameter of about 125 microns. With respect to the optical fiber's surrounding coating layers, the primary coating typically has an outer diameter of between about 175 microns and about 195 microns (i.e., a primary coating thickness of between about 25 microns and 35 microns), and the secondary coating typically has an outer diameter of between about 235 microns and about 265 microns (i.e., a secondary coating thickness of between about 20 microns and 45 microns). Optionally, the present optical fiber may include an outermost ink layer, which is typically between two and ten microns in thickness.

In one alternative embodiment, an optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

By way of illustration, in such exemplary embodiments, the primary coating layer may have an outer diameter of between about 135 microns and about 175 microns (e.g., about 160 microns), typically less than 165 microns (e.g., between about 135 microns and 150 microns), and usually more than 140 microns (e.g., between about 145 microns and 155 microns, such as about 150 microns).

Moreover, in such exemplary embodiments, the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns). By way of further illustration, an optical fiber may employ a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced thickness secondary coating of between 15 microns and 25 microns).

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

Reducing the diameter of the component glass fiber might make the resulting optical fiber more susceptible to microbending attenuation. That said, the advantages of further reducing optical-fiber diameter might be worthwhile for some optical-fiber applications.

As noted, the present optical fibers may include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

The present optical fibers may be manufactured by drawing from final preforms.

A final preform may be manufactured by providing a primary preform with an outer overcladding layer (i.e., an overcladding process). The outer overcladding layer typically consists of doped or undoped, natural or synthetic, silica glass. Several methods are available for providing the outer overcladding layer.

In a first exemplary method, the outer overcladding layer may be provided by depositing and vitrifying natural or synthetic silica particles on the outer periphery of the primary preform under the influence of heat. Such a process is known, for example, from U.S. Pat. Nos. 5,522,007, 5,194,714, 6,269,663, and 6,202,447, each of which is hereby incorporated by reference in its entirety.

In another exemplary method, a primary preform may be overcladded using a silica sleeve tube, which may or may not be doped. This sleeve tube may then be collapsed onto the primary preform.

In yet another exemplary method, an overcladding layer may be applied via an Outside Vapor Deposition (OVD) method. Here, a soot layer is first deposited on the outer periphery of a primary preform, and then the soot layer is vitrified to form glass.

The primary preforms may be manufactured via outside vapor deposition techniques, such as Outside Vapor Deposition (OVD) and Vapor Axial Deposition (VAD). Alternatively, the primary preforms may be manufactured via inside deposition techniques in which glass layers are deposited on the inner surface of a substrate tube of doped or undoped silica glass, such as Modified Chemical Vapor Deposition (MCVD), Furnace Chemical Vapor Deposition (FCVD), and Plasma Chemical Vapor Deposition (PCVD).

By way of example, the primary preforms may be manufactured using a PCVD process, which can precisely control the central core's gradient refractive index profile.

A depressed trench, for instance, may be deposited on the inner surface of a substrate tube as part of the chemical vapor deposition process. More typically, a depressed trench may be manufactured either (i) by using a fluorine-doped substrate tube as the starting point of the internal deposition process for deposition of the gradient refractive index central core or (ii) by sleeving a fluorine-doped silica tube over the gradient refractive index central core, which itself may be produced using an outside deposition process (e.g., OVD or VAD). Accordingly, a component glass fiber manufactured from the resulting preform may have a depressed trench located at the periphery of its central core.

As noted, a primary preform may be manufactured via an inside deposition process using a fluorine-doped substrate tube. The resulting tube containing the deposited layers may be sleeved by one or more additional fluorine-doped silica tubes so as to increase the thickness of a depressed trench, or to create a depressed trench having a varying refractive index over its width. Although not required, one or more additional sleeve tubes (e.g., fluorine-doped substrate tubes) may be collapsed onto the primary preform before an overcladding step is carried out. The process of sleeving and collapsing is sometimes referred to as jacketing and may be repeated to build several glass layers on the outside of the primary preform.

The present optical fibers may be deployed in various structures, such as those exemplary structures disclosed hereinafter.

For example, one or more of the present optical fibers may be enclosed within a buffer tube. For instance, optical fiber may be deployed in either a single-fiber loose buffer tube or a multi-fiber loose buffer tube. With respect to the latter, multiple optical fibers may be bundled or stranded within a buffer tube or other structure. In this regard, within a multi-fiber loose buffer tube, fiber sub-bundles may be separated with binders (e.g., each fiber sub-bundle is enveloped in a binder). Moreover, fan-out tubing may be installed at the termination of such loose buffer tubes to directly terminate loose buffered optical fibers with field-installed connectors.

In other embodiments, the buffer tube may tightly surround the outermost optical fiber coating (i.e., tight buffered fiber) or otherwise surround the outermost optical-fiber coating or ink layer to provide an exemplary radial clearance of between about 50 and 100 microns (i.e., a semi-tight buffered fiber).

With respect to the former tight buffered fiber, the buffering may be formed by coating the optical fiber with a curable composition (e.g., a UV-curable material) or a thermoplastic material. The outer diameter of tight buffer tubes, regardless of whether the buffer tube is formed from a curable or non-curable material, is typically less than about 1,000 microns (e.g., either about 500 microns or about 900 microns).

With respect to the latter semi-tight buffered fiber, a lubricant may be included between the optical fiber and the buffer tube (e.g., to provide a gliding layer).

As will be known by those having ordinary skill in the art, an exemplary buffer tube enclosing optical fibers as disclosed herein may be formed of polyolefins (e.g., polyethylene or polypropylene), including fluorinated polyolefins, polyesters (e.g., polybutylene terephthalate), polyamides (e.g., nylon), as well as other polymeric materials and blends. In general, a buffer tube may be formed of one or more layers. The layers may be homogeneous or include mixtures or blends of various materials within each layer.

In this context, the buffer tube may be extruded (e.g., an extruded polymeric material) or pultruded (e.g., a pultruded, fiber-reinforced plastic). By way of example, the buffer tube may include a material to provide high temperature and chemical resistance (e.g., an aromatic material or polysulfone material).

Although buffer tubes typically have a circular cross section, buffer tubes alternatively may have an irregular or non-circular shape (e.g., an oval or a trapezoidal cross-section).

Alternatively, one or more of the present optical fibers may simply be surrounded by an outer protective sheath or encapsulated within a sealed metal tube. In either structure, no intermediate buffer tube is necessarily required.

Multiple optical fibers as disclosed herein may be sandwiched, encapsulated, and/or edge bonded to form an optical fiber ribbon. Optical fiber ribbons can be divisible into subunits (e.g., a twelve-fiber ribbon that is splittable into six-fiber subunits). Moreover, a plurality of such optical fiber ribbons may be aggregated to form a ribbon stack, which can have various sizes and shapes.

For example, it is possible to form a rectangular ribbon stack or a ribbon stack in which the uppermost and lowermost optical fiber ribbons have fewer optical fibers than those toward the center of the stack. This construction may be useful to increase the density of optical elements (e.g., optical fibers) within the buffer tube and/or cable.

In general, it is desirable to increase the filling of transmission elements in buffer tubes or cables, subject to other constraints (e.g., cable or mid-span attenuation). The optical elements themselves may be designed for increased packing density. For example, the optical fiber may possess modified properties, such as improved refractive-index profile, core or cladding dimensions, or primary-coating thickness and/or modulus, to improve microbending and macrobending characteristics.

By way of example, a rectangular ribbon stack may be formed with or without a central twist (i.e., a "primary twist"). Those having ordinary skill in the art will appreciate that a ribbon stack is typically manufactured with rotational twist to allow the tube or cable to bend without placing excessive mechanical stress on the optical fibers during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

As will be known to those having ordinary skill in the art, such optical fiber ribbons may be positioned within a buffer tube or other surrounding structure, such as a buffer-tube-free cable. Subject to certain restraints (e.g., attenuation), it is desirable to increase the density of elements such as optical fibers or optical fiber ribbons within buffer tubes and/or optical fiber cables.

A plurality of buffer tubes containing optical fibers (e.g., loose or ribbonized fibers) may be positioned externally adjacent to and stranded around a central strength member. This stranding can be accomplished helically in one direction, known as "S" or "Z" stranding, or via Reverse Oscillated Lay stranding, known as "S-Z" stranding. Stranding about the central strength member reduces optical fiber strain when cable strain occurs during installation and use.

Those having ordinary skill in the art will understand the benefit of minimizing fiber strain for both tensile cable strain and longitudinal compressive cable strain during installation or operating conditions.

With respect to tensile cable strain, which may occur during installation, the cable will become longer while the optical fibers can migrate closer to the cable's neutral axis to reduce, if not eliminate, the strain being translated to the optical fibers. With respect to longitudinal compressive strain, which may occur at low operating temperatures due to shrinkage of the cable components, the optical fibers will migrate farther away from the cable's neutral axis to reduce, if not eliminate, the compressive strain being translated to the optical fibers.

In a variation, two or more substantially concentric layers of buffer tubes may be positioned around a central strength member. In a further variation, multiple stranding elements (e.g., multiple buffer tubes stranded around a strength member) may themselves be stranded around each other or around a primary central strength member.

Alternatively, a plurality of buffer tubes containing optical fibers (e.g., loose or ribbonized fibers) may be simply placed externally adjacent to the central strength member (i.e., the buffer tubes are not intentionally stranded or arranged around the central strength member in a particular manner and run substantially parallel to the central strength member).

Alternatively still, the present optical fibers may be positioned within a central buffer tube (i.e., the central buffer tube cable has a central buffer tube rather than a central strength member). Such a central buffer tube cable may position strength members elsewhere. For instance, metallic or non-metallic (e.g., GRP) strength members may be positioned within the cable sheath itself, and/or one or more layers of high-strength yarns (e.g., aramid or non-aramid yarns) may be positioned parallel to or wrapped (e.g., contrahelically) around the central buffer tube (i.e., within the cable's interior space). As will be understood by those having ordinary skill in the art, such strength yarns provide tensile strength to fiber optic cables. Likewise, strength members can be included within the buffer tube's casing.

Strength yarns may be coated with a lubricant (e.g., fluoropolymers), which may reduce unwanted attenuation in fiber optic cables (e.g., rectangular, flat ribbon cables or round, loose tube cables) that are subjected to relatively tight bends (i.e., a low bend radius). Moreover, the presence of a lubricant on strength yarns (e.g., aramid strength yarns) may facilitate removal of the cable jacketing by reducing unwanted bonding between the strength yarns and the surrounding cable jacket.

In other embodiments, the optical fibers may be placed within a slotted core cable. In a slotted core cable, optical fibers, individually or as a fiber ribbon, may be placed within pre-shaped helical grooves (i.e., channels) on the surface of a central strength member, thereby forming a slotted core unit. The slotted core unit may be enclosed by a buffer tube. One or more of such slotted core units may be placed within a slotted core cable. For example, a plurality of slotted core units may be helically stranded around a central strength member.

Alternatively, the optical fibers may also be stranded in a maxitube cable design, whereby the optical fibers are stranded around themselves within a large multi-fiber loose buffer tube rather than around a central strength member. In other words, the large multi-fiber loose buffer tube is centrally positioned within the maxitube cable. For example, such maxitube cables may be deployed in optical ground wires (OPGW).

In another cabling embodiment, multiple buffer tubes may be stranded around themselves without the presence of a central member. These stranded buffer tubes may be surrounded by a protective tube. The protective tube may serve as the outer casing of the fiber optic cable or may be further surrounded by an outer sheath. The protective tube may either tightly surround or loosely surround the stranded buffer tubes.

As will be known to those having ordinary skill in the art, additional elements may be included within a cable core. For example, copper cables or other active, transmission elements may be stranded or otherwise bundled within the cable sheath. Passive elements may also be placed within the cable core, such as between the interior walls of the buffer tubes and the enclosed optical fibers. Alternatively and by way of example, passive elements may be placed outside the buffer tubes between the respective exterior walls of the buffer tubes and the interior wall of the cable jacket, or within the interior space of a buffer-tube-free cable.

For example, yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers to the surrounding buffer tube and/or cable jacketing (e.g., via adhesion, friction, and/or compression). Exemplary water-swellable elements are disclosed in commonly assigned U.S. Pat. No. 7,515,795 for a Water-Swellable Tape, Adhesive-Backed for Coupling When Used Inside a Buffer Tube, which is hereby incorporated by reference in its entirety.

Moreover, an adhesive (e.g., a hot-melt adhesive or curable adhesive, such as a silicone acrylate cross-linked by exposure to actinic radiation) may be provided on one or more passive elements (e.g., water-swellable material) to bond the elements to the buffer tube. An adhesive material may also be used to bond the water-swellable element to optical fibers within the buffer tube. Exemplary arrangements of such elements are disclosed in commonly assigned U.S. Pat. No. 7,599,589 for a Gel-Free Buffer Tube with Adhesively Coupled Optical Element, which is hereby incorporated by reference in its entirety.

The buffer tubes (or buffer-tube-free cables) may also contain a thixotropic composition (e.g., grease or grease-like gels) between the optical fibers and the interior walls of the buffer tubes. For example, filling the free space inside a buffer tube with water-blocking, petroleum-based filling grease helps to block the ingress of water. Further, the thixotropic filling grease mechanically (i.e., viscously) couples the optical fibers to the surrounding buffer tube.

Such thixotropic filling greases are relatively heavy and messy, thereby hindering connection and splicing operations. Thus, the present optical fibers may be deployed in dry cable structures (i.e., grease-free buffer tubes).

Exemplary buffer tube structures that are free from thixotropic filling greases are disclosed in commonly assigned U.S. Pat. No. 7,724,998 for a Coupling Composition for Optical Fiber Cables (Parris et al.), which is hereby incorporated by reference in its entirety. Such buffer tubes employ coupling compositions formed from a blend of high-molecular weight elastomeric polymers (e.g., about 35 weight percent or less) and oils (e.g., about 65 weight percent or more) that flow at low temperatures. Unlike thixotropic filling greases, the coupling composition (e.g., employed as a cohesive gel or foam) is typically dry and, therefore, less messy during splicing.

As will be understood by those having ordinary skill in the art, a cable enclosing optical fibers as disclosed herein may have a sheath formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape, along with one or more dielectric jackets, may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath.

Similar to buffer tubes, optical fiber cable sheaths typically have a circular cross section, but cable sheaths alternatively may have an irregular or non-circular shape (e.g., an oval, trapezoidal, or flat cross-section).

By way of example, the present optical fiber may be incorporated into single-fiber drop cables, such as those employed for Multiple Dwelling Unit (MDU) applications. In such deployments, the cable jacketing must exhibit crush resistance, abrasion resistance, puncture resistance, thermal stability, and fire resistance as required by building codes. An exemplary material for such cable jackets is thermally stable, flame-retardant polyurethane (PUR), which mechanically protects the optical fibers yet is sufficiently flexible to facilitate easy MDU installations. Alternatively, a flame-retardant polyolefin or polyvinyl chloride sheath may be used.

In general, and as will be known to those having ordinary skill in the art, a strength member is typically in the form of a rod or braided/helically wound wires or fibers, though other configurations will be within the knowledge of those having ordinary skill in the art.

Optical fiber cables containing optical fibers as disclosed may be variously deployed, including as drop cables, distribution cables, feeder cables, trunk cables, and stub cables, each of which may have varying operational requirements (e.g., temperature range, crush resistance, UV resistance, and minimum bend radius).

Such optical fiber cables may be installed within ducts, microducts, plenums, or risers. By way of example, an optical fiber cable may be installed in an existing duct or microduct by pulling or blowing (e.g., using compressed air). An exemplary cable installation method is disclosed in commonly assigned U.S. Pat. No. 7,574,095 for a Communication Cable Assembly and Installation Method, (Lock et al.), and U.S. Pat. No. 7,665,902 for a Modified Pre-Ferrulized Communication Cable Assembly and Installation Method, (Griffioen et al.), each of which is incorporated by reference in its entirety.

As noted, buffer tubes containing optical fibers (e.g., loose or ribbonized fibers) may be stranded (e.g., around a central strength member). In such configurations, an optical fiber cable's protective outer sheath may have a textured outer surface that periodically varies lengthwise along the cable in a manner that replicates the stranded shape of the underlying buffer tubes. The textured profile of the protective outer sheath can improve the blowing performance of the optical fiber cable. The textured surface reduces the contact surface between the cable and the duct or microduct and increases the friction between the blowing medium (e.g., air) and the cable. The protective outer sheath may be made of a low coefficient-of-friction material, which can facilitate blown installation. Moreover, the protective outer sheath can be provided with a lubricant to further facilitate blown installation.

In general, to achieve satisfactory long-distance blowing performance (e.g., between about 3,000 to 5,000 feet or more), the outer cable diameter of an optical fiber cable should be no more than about 70 to 80 percent of the duct's or microduct's inner diameter.

Compressed air may also be used to install optical fibers in an air blown fiber system. In an air blown fiber system, a network of unfilled cables or microducts is installed prior to the installation of optical fibers. Optical fibers may subsequently be blown into the installed cables as necessary to support the network's varying requirements.

Moreover, the optical fiber cables may be directly buried in the ground or, as an aerial cable, suspended from a pole or pylon. An aerial cable may be self-supporting, or secured or lashed to a support (e.g., messenger wire or another cable). Exemplary aerial fiber optic cables include overhead ground wires (OPGW), all-dielectric self-supporting cables (ADSS), all dielectric lash cables (AD-Lash), and figure-eight cables, each of which is well understood by those having ordinary skill in the art. Figure-eight cables and other designs can be directly buried or installed into ducts, and may optionally include a toning element, such as a metallic wire, so that they can be found with a metal detector.

In addition, although the optical fibers may be further protected by an outer cable sheath, the optical fiber itself may be further reinforced so that the optical fiber may be included within a breakout cable, which allows for the individual routing of individual optical fibers.

To effectively employ the present optical fibers in a transmission system, connections are required at various points in the network. Optical fiber connections are typically made by fusion splicing, mechanical splicing, or mechanical connectors.

The mating ends of connectors can be installed to the optical fiber ends either in the field (e.g., at the network location) or in a factory prior to installation into the network. The ends of the connectors are mated in the field in order to connect the optical fibers together or connect the optical fibers to the passive or active components. For example, certain optical fiber cable assemblies (e.g., furcation assemblies) can separate and convey individual optical fibers from a multiple optical fiber cable to connectors in a protective manner.

The deployment of such optical fiber cables may include supplemental equipment, which itself may employ the present optical fiber as previously disclosed. For instance, an amplifier may be included to improve optical signals. Dispersion compensating modules may be installed to reduce the effects of chromatic dispersion and polarization mode dispersion. Splice boxes, pedestals, and distribution frames, which may be protected by an enclosure, may likewise be included. Additional elements include, for example, remote terminal switches, optical network units, optical splitters, and central office switches.

A cable containing the present optical fibers may be deployed for use in a communication system (e.g., networking or telecommunications). A communication system may include fiber optic cable architecture such as fiber-to-the-node (FTTN), fiber-to-the-telecommunications enclosure (FTTE), fiber-to-the-curb (FITC), fiber-to-the-building (FTTB), and fiber-to-the-home (FTTH), as well as long-haul or metro architecture. Moreover, an optical module or a storage box that includes a housing may receive a wound portion of the optical fiber disclosed herein. By way of example, the optical fiber may be wound around a bending radius of less than about 15 millimeters (e.g., 10 millimeters or less, such as about 5 millimeters) in the optical module or the storage box.

Moreover, present optical fibers may be used in other applications, including, without limitation, fiber optic sensors or illumination applications (e.g., lighting).

The present optical fibers may include Fiber Bragg Grating (FBG). As will be known by those having ordinary skill in the art, FBG is a periodic or aperiodic variation in the refractive index of an optical fiber core and/or cladding. This variation in the refractive index results in a range of wavelengths (e.g., a narrow range) being reflected rather than transmitted, with maximum reflectivity occurring at the Bragg wavelength.

Fiber Bragg Grating is commonly written into an optical fiber by exposing the optical fiber to an intense source of ultraviolet light (e.g., a UV laser). In this respect, UV photons may have enough energy to break molecular bonds within an optical fiber, which alters the structure of the optical fiber, thereby increasing the optical fiber's refractive index. Moreover, dopants (e.g., boron or germanium) and/or hydrogen loading can be employed to increase photosensitivity.

In order to expose a coated glass fiber to UV light for the creation of FBG, the coating may be removed. Alternatively, coatings that are transparent at the particular UV wavelengths (e.g., the UV wavelengths emitted by a UV laser to write FBG) may be employed to render coating removal unnecessary. In addition, silicone, polyimide, acrylate, or PFCB coatings, for instance, may be employed for high-temperature applications.

A particular FBG pattern may be created by employing (i) a photomask placed between the UV light source and the optical fiber, (ii) interference between multiple UV light beams, which interfere with each other in accordance with the desired FBG pattern (e.g., a uniform, chirped, or titled pattern), or (iii) a narrow UV light beam for creating individual variations. The FBG structure may have, for example, a uniform positive-only index change, a Gaussian-apodized index change, a raised-cosine-apodized index change, or a discrete phase-shift index change. Multiple FBG patterns may be combined on a single optical fiber.

Optical fibers having FBG may be employed in various sensing applications (e.g., for detecting vibration, temperature, pressure, moisture, or movement). In this respect, changes in the optical fiber (e.g., a change in temperature) result in a shift in the Bragg wavelength, which is measured by a sensor. FBG may be used to identify a particular optical fiber (e.g., if the optical fiber is broken into pieces).

Fiber Bragg Grating may also be used in various active or passive communication components (e.g., wavelength-selective filters, multiplexers, demultiplexers, Mach-Zehnder interferometers, distributed Bragg reflector lasers, pump/laser stabilizers, and supervisory channels).

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,526,177 for a Fluorine-Doped Optical Fiber (Matthijsse et al.); U.S. Pat. No. 7,555,186 for an Optical Fiber (Flammer et al.); U.S. Pat. No. 8,055,111 for a Dispersion-Shifted Optical Fiber (Sillard et al.); U.S. Pat. No. 8,041,172 for a Transmission Optical Fiber Having Large Effective Area (Sillard et al.); International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Pat. No. 7,889,960 for a Bend-Insensitive Single-Mode Optical Fiber, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Pat. No. 7,995,888 for a Multimode Optical Fibers, filed Jul. 7, 2009, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for an Optical Fiber Amplifier Having Nanostructures, filed Feb. 19, 2010, (Burow et al.); U.S. Pat. No. 8,009,950 for a Multimode Fiber, filed Apr. 22, 2010, (Molin et al.); U.S. Patent Application Publication No. US2010/0310218 A1 for a Large Bandwidth Multimode Optical Fiber Having a Reduced Cladding Effect, filed Jun. 4, 2010, (Molin et al.); U.S. Patent Application Publication No. US2011/0058781 A1 for a Multimode Optical Fiber Having Improved Bending Losses, filed Sep. 9, 2010, (Molin et al.); U.S. Patent Application Publication No. US2011/0064367 A1 for a Multimode Optical Fiber, filed Sep. 17, 2010, (Molin et al.); U.S. Patent Application Publication No. US2011/0069724 A1 for an Optical Fiber for Sum-Frequency Generation, filed Sep. 22, 2010, (Richard et al.); U.S. Patent Application Publication No. US2011/0116160 A1 for a Rare-Earth-Doped Optical Fiber Having Small Numerical Aperture, filed Nov. 11, 2010, (Boivin et al.); U.S. Patent Application Publication No. US2011/0123161 A1 for a High-Bandwidth, Multimode Optical Fiber with Reduced Cladding Effect, filed Nov. 24, 2010, (Molin et al.); U.S. Patent Application Publication No. US2011/0123162 A1 for a High-Bandwidth, Dual-Trench-Assisted Multimode Optical Fiber, filed Nov. 24, 2010, (Molin et al.); U.S. Patent Application Publication No. US2011/0135262 A1 for a Multimode Optical Fiber with Low Bending Losses and Reduced Cladding Effect, filed Dec. 3, 2010, (Molin et al.); U.S. Patent Application Publication No. US2011/0135263 A1 for a High-Bandwidth Multimode Optical Fiber Having Reduced Bending Losses, filed Dec. 3, 2010, (Molin et al.); U.S. Patent Application Publication No. US2011/0188826 A1 for a Non- Zero Dispersion Shifted Optical Fiber Having a Large Effective Area, filed Jan. 31, 2011, (Sillard et al.); U.S. Patent Application Publication No. US2011/0188823 A1 for a Non-Zero Dispersion Shifted Optical Fiber Having a Short Cutoff Wavelength, filed Jan. 31, 2011, (Sillard et al.); U.S. Patent Application Publication No. 2011/0217012 A1 for a Broad-Bandwidth Multimode Optical Fiber Having Reduced Bending Losses, filed Mar. 1, 2011, (Bigot-Astruc et al.); U.S. Patent Application Publication No. 2011/0229101 A1 for a Single-Mode Optical Fiber, filed Mar. 15, 2011, (de Montmorillon et al.); U.S. Patent Application Publication No. 2012/0051703 A1 for a Single-Mode Optical Fiber, filed Jul. 1, 2011, (Bigot-Astruc et al.); U.S. Patent Application Publication No. 2012/0040184 A1 for a Method of Fabricating an Optical Fiber Preform, filed Aug. 10, 2011, (de Montmorillon et al.); U.S. patent application Ser. No. 13/275,921 for a Multimode Optical Fiber Insensitive to Bending Losses, filed Oct. 18, 2011, (Molin et al.); U.S. patent application Ser. No. 13/303,967 for a Radiation-Insensitive Optical Fiber Doped with Rare Earths, filed Nov. 23, 2011, (Burov et al.); U.S. patent application Ser. No. 13/315,712 for a Rare-Earth-Doped Optical Fiber, filed Dec. 9, 2011, (Boivin et al.); U.S. patent application Ser. No. 13/362,357 for a Broad-Bandwidth Optical Fiber, filed Jan. 31, 2012, (Molin et al.); U.S. patent application Ser. No. 13/362,395 for a Multimode Optical Fiber, filed Jan. 31, 2012, (Molin et al.); U.S. patent application Ser. No. 13/410,976 for a Rare-Earth-Doped Amplifying Optical Fiber, filed Mar. 2, 2012, (Burov et al.); and U.S. patent application Ser. No. 13/428,520 for a Bend-Resistant Multimode Optical Fiber, filed Mar. 23, 2012, (Molin et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Textured Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. Patent Application Publication No. US2009/0279833 A1 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. Pat. No. 7,974,507 A1 for a High-Fiber-Density Optical Fiber Cable (Louie et al.); U.S. Pat. No. 7,970,247 for a Buffer Tubes for Mid-Span Storage (Barker); U.S. Pat. No. 8,081,853 for Single-Fiber Drop Cables for MDU Deployments, filed Nov. 9, 2009, (Overton); U.S. Pat. No. 8,041,167 for an Optical-Fiber Loose Tube Cables, filed Nov. 9, 2009, (Overton); U.S. Pat. No. 8,145,026 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. Pat. No. 8,041,168 for Reduced-Diameter Ribbon Cables with High-Performance Optical Fiber, filed Nov. 10, 2009, (Overton); U.S. Pat. No. 8,031,997 for a Reduced-Diameter, Easy-Access Loose Tube Cable, filed Nov. 10, 2009, (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US 2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); U.S. Patent Application Publication No. US2011/0026889 A1 for a Tight-Buffered Optical Fiber Unit Having Improved Accessibility, filed Jul. 26, 2010, (Risch et al.); U.S. Patent Application Publication No. US2011/0064371 A1 for Methods and Devices for Cable Insertion into Latched Conduit, filed Sep. 14, 2010, (Leatherman et al.); U.S. Patent Application Publication No. 2011/0069932 A1 for a High-Fiber-Density Optical-Fiber Cable, filed Oct. 19, 2010, (Overton et al.); U.S. Patent Application Publication No. 2011/0091171 A1 for an Optical-Fiber Cable Having High Fiber Count and High Fiber Density, filed Oct. 19, 2010, (Tatat et al.); U.S. Patent Application Publication No. 2011/0176782 A1 for a Water-Soluble Water-Blocking Element, filed Jan. 19, 2011, (Parris); U.S. Patent Application Publication No. 2011/0268400 A1 for a Data-Center Cable, filed Apr. 28, 2011, (Louie et al.); U.S. Patent Application Publication No. 2011/0268398 A1 for a Bundled Fiber Optic Cables, filed May 3, 2011, (Quinn et al.); U.S. Patent Application Publication No. 2011/0287195 A1 for a Curing Apparatus Employing Angled UVLEDs, filed May 19, 2011, (Molin); U.S. Patent Application Publication No. 2012/0009358 for a Curing Apparatus Having UV Sources That Emit Differing Ranges of UV Radiation, filed Jun. 3, 2011, (Gharbi et al.); U.S. Patent Application Publication No. 2012/0014652 A1 for a Adhesively Coupled Optical Fibers and Enclosing Tape, filed Jul. 13, 2011, (Parris); U.S. Patent Application Publication No. 2012/0040105 A1 for a Method and Apparatus Providing Increased UVLED Intensity, filed Aug. 10, 2011, (Overton); U.S. Patent Application Publication No. 2012/0057833 A1 for an Optical-Fiber Module Having Improved Accessibility, filed Aug. 31, 2011, (Tatat); and U.S. patent application Ser. No. 13/401,026 for a Optical-Fiber Interconnect Cable, filed Feb. 21, 2012, (Risch et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A multimode optical fiber, comprising:
a central core surrounded by an outer cladding, said central core having (i) an outer radius $r_1$, (ii) an alpha-index profile, (iii) a maximum refractive index difference $\Delta n_1$ with respect to said outer cladding that is less than or equal to zero, and (iv) at said outer radius $r_1$, a minimum refractive index difference $\Delta n_{end}$ with respect to said outer cladding; and
an inner cladding positioned between said central core and said outer cladding, said inner cladding having (i) an outer radius $r_2$, (ii) a width $w_2$, and (iii) a negative refractive index difference $\Delta n_2$ with respect to said outer cladding;
wherein said central core has a maximum germanium concentration of 0.1 weight percent or less;
wherein said central core has an average chlorine concentration of 0.1 weight percent or less; and
wherein, at said outer radius $r_1$, said central core has a minimum fluorine concentration of 3 weight percent or more.

2. The multimode optical fiber according to claim 1, wherein said inner cladding immediately surrounds said central core.

3. The multimode optical fiber according to claim 1, wherein said central core has a germanium concentration of less than 0.005 weight percent.

4. The multimode optical fiber according to claim 1, wherein the optical fiber has a core-cladding average halogen ratio of 20 or greater.

5. The multimode optical fiber according to claim 1, wherein the optical fiber has a core-cladding average halogen ratio of between 48 and 300.

6. The multimode optical fiber according to claim 1, wherein the optical fiber has a halogen ratio at said central core's outer radius $r_1$ of between 50 and 500.

7. The multimode optical fiber according to claim 1, wherein the optical fiber has a core-average halogen ratio of between 30 and 170.

8. The multimode optical fiber according to claim 1, wherein said central core has an average chlorine concentration of about 0.07 weight percent or less.

9. The multimode optical fiber according to claim 1, wherein, across the entire width of said central core, said central core's chlorine concentration is less than about 0.1 weight percent.

10. The multimode optical fiber according to claim 1, wherein at said outer radius $r_1$, said central core has a minimum fluorine concentration of about 3.5 weight percent.

11. A multimode optical fiber, comprising:
a central core surrounded by an outer cladding, said central core having (i) an outer radius $r_1$, (ii) an alpha-index profile, (iii) a maximum refractive index difference $\Delta n_1$ with respect to said outer cladding that is less than or equal to zero, and (iv) at said outer radius $r_1$, a minimum refractive index difference $\Delta n_{end}$ with respect to said outer cladding; and
a buried trench positioned between said central core and said outer cladding, said buried trench having (i) an outer radius $r_3$, (ii) a width $w_3$, and (iii) a negative refractive index difference $\Delta n_3$ with respect to said outer cladding such that $\Delta n_3 < \Delta n_{end}$; and
an intermediate cladding positioned between said buried trench and said outer cladding, said intermediate cladding having (i) an outer radius $r_4$, (ii) a width $w_4$, and (iii) a negative refractive index difference $\Delta n_4$ with respect to said outer cladding;
wherein said central core has a maximum germanium concentration of 0.1 weight percent or less;
wherein said central core has an average chlorine concentration of 0.1 weight percent or less; and wherein, at said outer radius $r_1$, said central core has a minimum fluorine concentration of 3 weight percent or more.

12. The multimode optical fiber according to claim 11, wherein:
    said buried trench immediately surrounds said central core; and
    said intermediate cladding immediately surrounds said buried trench.

13. The multimode optical fiber according to claim 11, wherein said central core has a germanium concentration of less than 0.005 weight percent.

14. The multimode optical fiber according to claim 11, wherein the optical fiber has a core-cladding average halogen ratio of 25 or greater.

15. The multimode optical fiber according to claim 11, wherein the optical fiber has a core-average halogen ratio of 20 or greater.

16. The multimode optical fiber according to claim 11, wherein said central core has an average chlorine concentration of about 0.06 weight percent or less.

17. The multimode optical fiber according to claim 11, wherein said central core's minimum refractive index difference $\Delta n_{end}$ is between about $-14 \times 10^{-3}$ and $-20 \times 10^{-3}$.

18. The multimode optical fiber according to claim 11, wherein said central core's maximum refractive index difference $\Delta n_1$ is between about 0 and $-5 \times 10^{-3}$.

19. The multimode optical fiber according to claim 11, wherein the difference between said buried trench's refractive index difference $\Delta n_3$ and said central core's minimum refractive index $\Delta n_{end}$ is between $-3 \times 10^{-3}$ and $-10 \times 10^{-3}$.

20. A multimode optical fiber, comprising:
    a central core surrounded by an outer cladding, said central core having (i) an outer radius $r_1$, (ii) an alpha-index profile, (iii) a maximum refractive index difference $\Delta n_1$ with respect to said outer cladding that is less than or equal to zero, and (iv) at said outer radius $r_1$, a minimum refractive index difference $\Delta n_{end}$ with respect to said outer cladding; and
    an inner cladding positioned between said central core and said outer cladding, said inner cladding having (i) an outer radius $r_2$, (ii) a width $w_2$, and (iii) a negative refractive index difference $\Delta n_e$ with respect to said outer cladding;
    a buried trench positioned between said inner cladding and said outer cladding, said buried trench having (i) an outer radius $r_3$, (ii) a width $w_3$, and (iii) a negative refractive index difference $\Delta n_3$ with respect to said outer cladding such that $\Delta n_3 < \Delta n_{end}$; and
    an intermediate cladding positioned between said buried trench and said outer cladding, said intermediate cladding having (i) an outer radius $r_4$, (ii) a width $w_4$, and (iii) a negative refractive index difference $\Delta n_4$ with respect to said outer cladding;
    wherein said central core has a maximum germanium concentration of 0.1 weight percent or less;
    wherein said central core has an average chlorine concentration of 0.1 weight percent or less; and
    wherein, at said outer radius $r_1$, said central core has a minimum fluorine concentration of 3 weight percent or more.

21. The multimode optical fiber according to claim 20, wherein:
    said inner cladding immediately surrounds said central core;
    said buried trench immediately surrounds said inner cladding; and
    said intermediate cladding immediately surrounds said buried trench.

22. The multimode optical fiber according to claim 20, wherein said central core has a germanium concentration of less than 0.005 weight percent.

23. The multimode optical fiber according to claim 20, wherein the optical fiber has a core-cladding average halogen ratio of 20 or greater.

24. The multimode optical fiber according to claim 20, wherein:
    said central core's maximum refractive index difference $\Delta n_1$ is between about $-0.05 \times 10^{-3}$ and $-2 \times 10^{-3}$; and
    the optical fiber has a core-cladding-average halogen ratio of between 48 and 240.

25. The multimode optical fiber according to claim 20, wherein the optical fiber has a halogen ratio at said central core's outer radius $r_1$ of 30 or more.

26. The multimode optical fiber according to claim 20, wherein the optical fiber has a core-average halogen ratio of between 30 and 170.

27. The multimode optical fiber according to claim 20, wherein said central core has an average chlorine concentration of about 0.05 weight percent or less.

28. The multimode optical fiber according to claim 20, wherein said central core's minimum refractive index difference $\Delta n_{end}$ is between about $-14 \times 10^{-3}$ and $-20 \times 10^{-3}$.

29. The multimode optical fiber according to claim 20, wherein the difference between said buried trench's refractive index difference $\Delta n_3$ and said central core's minimum refractive index $\Delta n_{end}$ is between about $-1 \times 10^{-3}$ and $-15 \times 10^{-3}$.

30. The multimode optical fiber according to claim 20, wherein the difference between said buried trench's refractive index difference $\Delta n_3$ and said central core's minimum refractive index $\Delta n_{end}$ is between about $-3 \times 10^{-3}$ and $-10 \times 10^{-3}$.

31. The multimode optical fiber according to claim 20, wherein said buried trench's volume $v_3$ is about $260\% \cdot \mu m^2$ or more.

* * * * *